(12) United States Patent
Yoon et al.

(10) Patent No.: US 10,158,464 B2
(45) Date of Patent: Dec. 18, 2018

(54) MOBILE TERMINAL DEVICES, MOBILE PROCESSING CIRCUITS, AND METHODS OF PROCESSING SIGNALS

(71) Applicant: Intel IP Corporation, Santa Clara, CA (US)

(72) Inventors: Dae Jung Yoon, Santa Clara, CA (US); Bertram Gunzelmann, Koenigsbrunn (DE); Ansgar Scherb, Nuremberg (DE)

(73) Assignee: Intel IP Corporation, Santa Clara, CA (US)

( * ) Notice: Subject to any disclaimer, the term of this patent is extended or adjusted under 35 U.S.C. 154(b) by 297 days.

(21) Appl. No.: 14/864,995

(22) Filed: Sep. 25, 2015

(65) Prior Publication Data
US 2017/0093538 A1    Mar. 30, 2017

(51) Int. Cl.
| | |
|---|---|
| *H04W 72/04* | (2009.01) |
| *H04L 5/00* | (2006.01) |
| *H04B 7/024* | (2017.01) |
| *H04B 7/06* | (2006.01) |
| *H04L 27/26* | (2006.01) |

(52) U.S. Cl.
CPC .......... *H04L 5/0048* (2013.01); *H04B 7/024* (2013.01); *H04B 7/0626* (2013.01); *H04L 27/2613* (2013.01)

(58) Field of Classification Search
CPC ...... H04W 72/04; H04W 88/08; H04W 76/00
See application file for complete search history.

(56) References Cited

U.S. PATENT DOCUMENTS

| | | | | |
|---|---|---|---|---|
| 5,640,431 | A * | 6/1997 | Bruckert | H04B 1/707 375/150 |
| 9,532,326 | B2 * | 12/2016 | Forsgren | H04L 25/0224 |
| 2002/0196731 | A1 * | 12/2002 | Laroia | H04L 27/2659 370/206 |
| 2010/0248708 | A1 | 9/2010 | Koivisto et al. | |
| 2010/0279707 | A1 | 11/2010 | Fischer et al. | |

(Continued)

FOREIGN PATENT DOCUMENTS

WO    2014129716 A1    8/2014

OTHER PUBLICATIONS

Office Action received for the U.S. Appl. No. 14/859,404, dated Mar. 29, 2017, 15 pages (For reference purpose only).

(Continued)

*Primary Examiner* — Hassan A Phillips
*Assistant Examiner* — Prenell Jones
(74) *Attorney, Agent, or Firm* — Viering, Jentschura & Partner MBB

(57) ABSTRACT

A mobile terminal device may include a receiver circuit and a processing circuit. The receiver circuit may be configured to receive a composite signal comprising a plurality of reference signal patterns associated with a plurality of transmit locations. The processing circuit may be configured to identify a first reference signal pattern and a second reference signal pattern from the plurality of reference signal patterns; generate a first offset estimate and a second offset estimate based on the first reference signal pattern and the second reference signal pattern; determine a refined offset estimate based on the first offset estimate and the second offset estimate, wherein first offset estimate has a greater offset estimation range than the second offset estimate.

24 Claims, 10 Drawing Sheets

(56) References Cited

U.S. PATENT DOCUMENTS

| | | | |
|---|---|---|---|
| 2011/0223901 A1* | 9/2011 | Swarts | H04L 27/2657 455/422.1 |
| 2011/0263282 A1 | 10/2011 | Rune et al. | |
| 2013/0070726 A1 | 3/2013 | Zhang et al. | |
| 2013/0083780 A1* | 4/2013 | Luo | H04W 72/0406 370/336 |
| 2013/0170590 A1* | 7/2013 | Hyll | H04L 27/0014 375/343 |
| 2013/0178202 A1* | 7/2013 | Ho | H04W 8/00 455/422.1 |
| 2013/0279437 A1 | 10/2013 | Ng et al. | |
| 2013/0308555 A1* | 11/2013 | Ho | H04L 5/0048 370/329 |
| 2014/0036800 A1* | 2/2014 | Frenne | H04L 5/0035 370/329 |
| 2014/0056156 A1 | 2/2014 | Joengren | |
| 2014/0092829 A1 | 4/2014 | Han et al. | |
| 2014/0211762 A1 | 7/2014 | Bontu et al. | |
| 2014/0301303 A1 | 10/2014 | Roman et al. | |
| 2015/0085715 A1 | 3/2015 | Sun et al. | |
| 2015/0092655 A1 | 4/2015 | Liao et al. | |
| 2015/0350928 A1 | 12/2015 | Zhang et al. | |

OTHER PUBLICATIONS

Notice of Allowance received for the U.S. Appl. No. 14/859,404 (9 Pages) dated Aug. 1, 2017 (Reference Purpose Only).
3GPP, TS 36.213 v12.5.0, 2015, pp. 72-73, Release 12.
Qualcomm Europe, "3GPP TSG-RAN WG1 #56bis; R1-091471, Time synchronization requirements for different LTE-A techniques", R1-091471, 2009, 4pages, South Korea.
Ericsson et al, "3GPP TSG-RAN WG1 #64; R1-110649, Aspects on Distributed RRUs with Shared Cell-ID for Heterogeneous Deployments", R1-110649, 2011, 11 pages,Taiwan.
Catt, "3GPP TSG RAN WG1 Meeting #72; R1-130118, Discussion on RE mapping for NZP CSI-RS", R1-130118, 2013, 5pages, Malta.
International Search Report and the written opinion based on Application No. PCT/US2016/047115 (14 Pages) dated Nov. 18, 2016 (Reference Purpose Only).

* cited by examiner

NZP-CSI-RS RE allocation, AP 15 with normal CP

Timing offset phase rotation and DMRS-based/NZP-CSI-RS-based
timing offset estimation range

MOBILE TERMINAL DEVICES, MOBILE PROCESSING CIRCUITS, AND METHODS OF PROCESSING SIGNALS

TECHNICAL FIELD

Various embodiments relate generally to mobile terminal devices, mobile processing circuits, and methods of processing signals.

BACKGROUND

Timing synchronization between mobile terminals and network access points are an essential aspect in many conventional radio access technologies. Accordingly, it is critical that mobile terminals obtain initial timing synchronization and perform continuous time tracking with one or more network access points.

Conventional mobile terminals operating on Long Term Evolution (LTE) networks obtain initial timing synchronization with a proximate cell through reception and analysis of synchronization sequences such as Primary Synchronization Signals (PSS) and Secondary Synchronization Signals (SSS). After obtaining initial timing synchronization and determining the identity of the proximate cell using PSS and SSS, a mobile terminal may perform continuous synchronization tracking using cell specific reference signals (CRS) transmitted by the proximate cell. Accordingly, timing synchronization (i.e. both initial synchronization and tracking) is conventionally reliant on a combination of both synchronization sequences and CRS.

In conventional use cases, mobile terminals operating on LTE networks may receive both control and traffic data from a single cell, i.e. a serving cell. However, recent introductions to the 3GPP specification, such as Coordinated Multipoint (CoMP) as introduced in Release 11, may involve receiving control and traffic data from different cells, which may change over time. For example, in a Joint Transmission (JT) CoMP scheme a mobile terminal may receive control data from a serving cell and subsequently receive traffic data from a plurality of cells, i.e. to promote transmit diversity in reception of traffic data. Alternatively, in a Dynamic Point Switching (DPS) CoMP scheme a mobile terminal may receive control data from a serving cell and subsequently receive traffic data from any one of a potential set of transmitting cells, where the transmitting cell performing transmission of the traffic data may change every subframe.

Accordingly, timing synchronization in scenarios having multiple transmit locations to a single mobile terminal may require synchronization with each transmit location instead of only a single transmit location as in conventional use cases.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
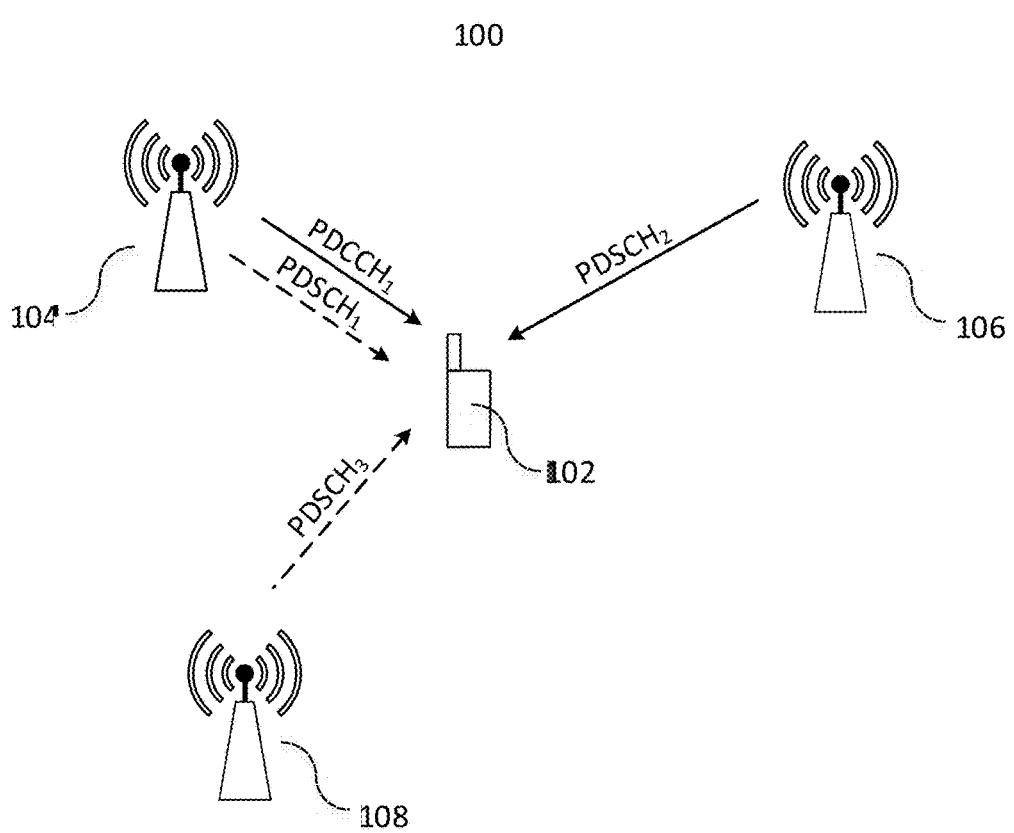
FIG. 1 shows a mobile communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

A "processing circuit" (or equivalently "processing circuitry") as used herein is understood as referring to a circuit that performs processing on a signal, such as e.g. any circuit that performs processing on an electrical or optical signal. A processing circuit may thus refer to any analog or digital circuitry that alters a characteristic or property of an electrical or optical signal. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), microprocessor(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, a "cell" in the context of telecommunications may be understood as a sector served by a base station. Accordingly, a cell may be a set of geographically co-located antennas that correspond to a particular sectorization. A base station may thus serve one or more "cells" (or sectors), where each cell includes at least one unique communication channel. An "inter-cell handover" may thus be understood as handover from a first "cell" to a second "cell", where the first "cell" is different than the second "cell". "Inter-cell handovers" may be characterized as either "inter-base station handovers" or "intra-base station handovers". "Inter-base station handovers" may be understood as handover from a first "cell" to a second "cell", where the first "cell" is provided at a first base station and the second "cell" is provided at a second, different base station. "Intra-base station handovers" may be understood as a handover from a first "cell" to a second "cell", where the first "cell" is provided at the same base station as the second "cell". A "serving cell" may be understood as a "cell" (or e.g. a "proxy cell") which a mobile terminal is currently connected to according to the mobile communication protocols of the associated mobile communication network standard. Furthermore, the term "cell" may be utilized herein in reference to any of a macrocell, microcell, femtocell, picocell, etc.

A mobile communication network may be characterized as a "heterogeneous" network or "homogenous" work. In a homogenous network, each cell may serve geographic areas having substantially similar size. In contrast, cells of a heterogeneous network may serve geographic areas having substantially different sizes. For example, a homogenous network may be composed entirely of "macro" cells, each of which transmit at high power to cover large geographic areas having substantially similar size. A heterogeneous network may be composed of cells serving geographic areas of a varying array of sizes, including macro cells, micro cells, pico cells, and femto cells. Accordingly, one or more "small" cells (micro, pico, femto, etc.) may be contained within a nearby macro cell. A further example may be a Remote Radio Head (RRH), which may be connected to a base station over e.g. an optical fiber, and may serve a smaller cell (e.g. pico or femto) which may be contained within a macro cell of the base station.

Downlink communications in mobile communication networks, i.e. data transmission from a network access point to a mobile terminal, may be conventionally received by a mobile terminal from a single network access point. Such downlink transmissions may require tight timing synchronization between a mobile terminal and the network access point it is receiving data from. However, recent advances in mobile communication technologies, such as Coordinated Multipoint (CoMP) network architectures, have provided additional scenarios involving multiple network access points. As a result, mobile terminals may need to maintain timing synchronization with multiple network access points, thereby adding additional complexity to timing synchronization procedures.

Third Generation Partnership Project (3GPP) Release 11 has introduced downlink CoMP as an instrument for reduction of inter-cell interference and improved utilization of wireless resources in Long Term Evolution (LTE) networks. 3GPP has specified several different CoMP schemes, including coordinated scheduling/coordinated beamforming (CS/CB), dynamic point blanking (DPB), dynamic point switching (DPS), and joint transmission (JT) in order to provide varying degrees of coordination for downlink transmissions to mobile terminals.

Each CoMP scheme involves a level of coordination between multiple cells, i.e. "points", for transmission of downlink data traffic to a UE. Each CoMP implementation may include a set of points participating in such coordination, i.e. a CoMP cooperating set. CoMP schemes may include a set of points which participating mobile terminals are to perform and report signal measurements on, i.e. a CoMP measurement set. Each CoMP scheme may additionally include one or more transmission points (TPs), which collectively may be a subset of the CoMP cooperating set and/or the CoMP measuring set, that perform actual transmission of downlink data traffic to a given UE. CoMP schemes such as CS/CB and DPB may involve only cooperation in scheduling and beamforming between points to support transmission from a single TP to a given UE, and may thus be characterized by only having a single TP. As only a single TP may transmit downlink data traffic to a given UE, the downlink data traffic intended for the given UE may only need to be available at a single TP.

In contrast, JT and DPS (collectively referred to as Joint Processing (JP)) may have multiple TPs, and accordingly it may be possible for any single one of the TPs to transmit downlink data traffic to a given UE during a CoMP subframe. While control information associated with the Physical Downlink Control Channel (PDCCH) may be consistently transmitted to a UE from a single serving cell (which may or may not be a TP), downlink data traffic associated with the Physical Downlink Shared Channel (PDSCH) may be transmitted from any subset of a plurality of TPs during a given subframe. For example, JT schemes involve transmission of downlink data traffic by multiple TPs during a CoMP subframe, i.e. a plurality of the TPs may simultaneously transmit the same downlink data traffic to a single UE. DPS schemes involve dynamic switching of the actual transmitting TP on a subframe-by-subframe basis, and accordingly the active TP (i.e. the single TP performing PDSCH transmission during a given subframe) may switch between any one of the provided TPs every subframe.

3GPP Release 11 has included the aforementioned downlink CoMP schemes as part of Transmission Mode 10 (TM10). 3GPP Release 11 additionally specified two distinct configurations of TM10 UE behavior: TM10 UE type-A and TM10 UE type-B. TM10 UE type-A and TM10 UE type-B configurations are both associated with the concept of "quasi co-location", which specifies assumptions that a UE may make regarding large scale signal properties of antenna ports. TM10 UE Type-A may assume that antenna ports 0-3 and 7-22 of a serving cell are quasi co-located, i.e. have the same large scale signal properties such as Doppler shift, Doppler spread, average delay, and delay spread. In contrast, TM10 UE Type-B may only assume that antenna ports 15-22 (e.g. corresponding to Channel State Information Reference Signal (CSI-RS) resource configurations) corresponding to a CSI-RS configuration specifically identified in control information and antenna ports 7-22 (e.g. corresponding to PDSCH and Demodulation Reference Signal (DMRS) configurations) are quasi co-located. A TM10 UE Type-B may thus need to receive control information specifying quasi co-location between specific antenna ports in order to assume quasi co-location between CSI-RS antenna ports and DMRS antenna ports. TM10 UE Type-B may not make any quasi co-location assumptions between CRS and CSI-RS or DMRS antenna ports.

It is appreciated that due to the associated quasi co-location assumptions relative to cell-specific reference signal (CRS) antenna ports 0-3, TM10 UE Type-A may be able to utilize CRS for timing synchronization procedures. However, CRS may be ineffective for timing synchronization purposes for TM10 UE type-B, especially in scenarios in which one or more TPs share the same cell ID and thus may transmit identical CRS.

Accordingly, TM10 UE type-B may utilize CSI-RS (specifically non-zero power CSI-RS, or NZP-CSI-RS) for timing synchronization. Cells that are part of a CoMP scheme in an LTE network may transmit an NZP-CSI-RS configuration according to one of 19 possible CSI-RS configurations on one or more of antenna ports 15-22. The network may provide a TM10 UE type-B with an NZP-CSI-RS configuration during each CoMP subframe that informs the TM10 UE type-B which NZP-CSI-RS configuration should be used for synchronized reception of data during the given CoMP subframe. The specified NZP-CSI-RS configuration may correspond to a single TP, such as e.g. in a DPS scheme, or more than one TP, such as e.g. in a JT scheme.

Accordingly, the network may provide a TM10 UE type-B with the relevant NZP-CSI-RS configuration for a given CoMP subframe as a PDSCH Resource Element (RE) Mapping and Quasi Co-location Indicator (PQI) index, which may be received by a TM10 UE type-B as control information associated with PDCCH during the beginning of each CoMP subframe. 3GPP has specified up to 4 possible values for the PQI index (e.g. 00, 01, 10, 11), where each PQI index uniquely corresponds to a parameter set specified by the higher layers. Each PQI index may thus, by way of the associated parameter set, correspond to a distinct NZP-CSI-RS configuration. A TM10 UE type-B may therefore receive and identify the PQI index for each CoMP subframe and utilize the NZP-CSI-RS configuration corresponding to the PQI index value for timing synchronization during each subframe, such as by calculating a timing offset estimate based on the NZP-CSI-RS configuration.

Each PQI index may correspond to one or more TPs in a CoMP scheme. For example, each PQI index may correspond to a single TP in a DPS scheme, thereby allocating each TP a distinct NZP-CSI-RS configuration. However, a PQI index may correspond to more than one TP in a JT scheme, thereby forming a "virtual TP" composed of several TPs that is associated with a single NZP-CSI-RS configuration. A TM10 UE type-B may thus not be able to explicitly identify which TP(s) is/are the active TP(s) (i.e. the TP(s) transmitting PDSCH data during the current CoMP subframe according to the specified PQI index). Nevertheless, TM10 UE type-B may maintain timing synchronization with each TP or set of TPs by way of utilizing the PQI index to identify the corresponding NZP-CSI-RS configuration (as specified in the parameter set associated with each PQI index) to perform timing synchronization during each CoMP subframe.

The NZP-CSI-RS configuration corresponding to each of the PQI indices may be a distinct NZP-CSI-RS configuration, where each NZP-CSI-RS configuration is distinguished by a different RE allocation in the time-frequency resource grid. Consequently, a TM10 UE type-B may be able to receive the NZP-CSI-RS configuration for each PQI index during each CoMP subframe. Although only one NZP-CSI-RS configuration may be utilized for synchronized PDSCH data demodulation, a TM10 UE type-B may nevertheless calculate a timing offset estimate for each received NZP-CSI-RS configuration, which may then be utilized at a later time. For example, a TM10 UE type-B may perform timing synchronization tracking on each PQI index by calculating a timing offset estimate for each received NZP-CSI-RS configuration. While only the timing offset corresponding to the NZP-CSI-RS configuration of the specified PQI index may be used for actual synchronized PDSCH data demodulation during a given CoMP subframe, a TM10 UE type-B may nevertheless maintain synchronization with the TP(s) associated with each PQI index by performing timing offset estimation on the NZP-CSI-RS configuration associated with each PQI index.

A TM10 UE type-B may thus maintain an NZP-CSI-RS-based timing offset estimate for each PQI index, and may update each NZP-CSI-RS-based timing offset estimate based on NZP-CSI-RS received from each TP during each subframe. As the RE allocation of each NZP-CSI-RS configuration is assumed constant, a TM10 UE type-B may continuously update the NZP-CSI-RS-based timing offset estimated associated with each PQI index during each subframe. A TM10 UE type-B may then select the appropriate NZP-CSI-RS-based timing offset estimate for each CoMP subframe based on the received PQI, and utilize the select NZP-CSI-RS-based timing offset estimate for PDSCH demodulation during the current subframe.

However, as will be detailed in this disclosure, NZP-CSI-RS-based timing offset estimation may have certain drawbacks when compared with conventional CRS-based timing offset estimation. For example, due to the relatively sparse distribution of NZP-CSI-RS in the frequency domain, NZP-CSI-RS-based timing offset estimation may suffer from limited estimation range, which may result in incorrect estimation values. Reception of PDSCH data using incorrect timing offset estimates may significantly corrupt the PDSCH data, thereby degrading device performance.

FIG. 1 illustrates an exemplary CoMP architecture for a DPS CoMP network 100. TPs 104-108 may each be a TP for DPS CoMP network 100, and accordingly may each be part of the CoMP cooperating set for CoMP network 100. TPs 104-108 may therefore each coordinate to transmit downlink data traffic to UE 102, which may be located proximate to TPs 104-108. It is appreciated that while 3 TPs are explicitly shown in FIG. 2, it is understood that more or fewer TPs may be utilized in a CoMP scenario. Additionally, while the following scenarios will be described where each TP uniquely corresponds to a PQI index, it is additionally understood that more than one TP may correspond to a PQI index, thus forming a "virtual cell" as previously indicated. Thus, while the following description may refer to a single TP as the "active TP" for each CoMP subframe, it is understood that more than one TP may be the "active TPs" in scenarios where multiple TPs are associated with a single PQI index.

Each of eNBs 104-108 may thus be available to transmit downlink data traffic associated with the PDSCH to UE 102 during each subframe. The active TP (i.e. the single TP of TPs 104-108 performing transmission of PDSCH data to UE 102 during the current subframe) may dynamically switch for each subframe, such as e.g. based on feedback received from UE 102 indicating the channel quality associated with PDSCH data received from each of TPs 104-108. UE 102 may thus need to be prepared to receive PDSCH data from any one of TPs 104-108 for each subframe, and accordingly may be required to maintain continuous synchronization with each of TPs 104-108.

As shown in FIG. 1, PDSCH channels $PDSCH_1$, $PDSCH_2$, and $PDSCH_3$ may each represent a wireless channel used to transmit PDSCH data from one of respective TPs 104-108 to UE 102. In accordance with DPS schemes as specified by 3GPP Release 11, only one of TPs 104-108 may be designated as the active TP during a given CoMP subframe, and accordingly only the respective PDSCH channel of PDSCH channels $PDSCH_1$, $PDSCH_2$, and $PDSCH_3$ may be active during the given CoMP subframe. As illustrated in FIG. 1, TP 106 may be designated as the active TP during the current subframe, and accordingly $PDSCH_2$ may be active during the current subframe (as indicated by the solid line for $PDSCH_2$). In contrast, PDSCH channels $PDSCH_1$ and $PDSCH_3$ may be inactive during the current subframe (as indicated by the dashed lines for $PDSCH_2$ and $PDSCH_3$). Although $PDSCH_1$ and $PDSCH_3$ may be inactive during the current subframe, TPs 106 and 108 may still transmit wireless signals that may be received by UE 102, such as e.g. reference signals as will be later described. It is appreciated that while the exemplary scenario of FIG. 1 includes three TPs, 3GPP Release 11 has specified the use of anywhere up to four TPs in downlink CoMP scenarios. In connection, it is understood that this disclosure is demonstrative in nature, and accordingly may be expanded in application to CoMP scenarios with any number of TPs.

TP 104 may be designated as the serving cell for UE 102, and therefore may exhibit an increased degree of control over communications with UE 102 than eNBs 106 and 108. It is appreciated that while the serving cell, i.e. TP 104, in the current exemplary scenario is a TP in DPS CoMP network 100, the serving cell for a TM10 UE type-B may or may not be a TP in a CoMP network. TP 104 may be responsible for transmitting control information to UE 102, such as control information associated with the PDCCH. TP 104 may therefore transmit PDCCH data to UE 102 over PDCCH channel $PDCCH_1$. TP 104 may transmit PDCCH data to UE 102 during each subframe. It is appreciated that the TP transmitting PDCCH data to UE 102 may not switch on a subframe basis. TP 104 may thus be solely responsible for transmission of PDCCH data to UE 102 for the duration of time that TP 104 remains the serving cell of UE 102.

3GPP Release 11 has identified several scenarios particularly applicable to CoMP architectures, where each scenario involves coordination between one or more macro enhanced nodeBs (eNB) and/or Remote Radio Heads (RRHs). It is appreciated that TPs 104-108 may in practice be any type of network access point of DPS CoMP network 100. For example, TPs 104-108 may be individual cells of one or more base stations, RRHs associated with one or more base stations, micro cells, etc.

In JP applications such as DPS CoMP network 100, a mobile terminal such as UE 102 may receive downlink data transmissions from multiple TPs over time, and accordingly may need to continuously maintain timing synchronization with each PQI index (i.e. the one or more TPs associated with each PQI index by way of the specified parameter sets). In one such scenario, multiple TPs in a JP configuration may share the same cell identity (cell ID). For example, TP 106 may be an RRH associated with TP 104, and may share the same cell ID with TP 104. TP 106 may therefore accordingly transmit identical cell-specific reference signals (CRSs), Primary Synchronization Signals (PSSs), and Secondary Synchronization Signals (SSSs) as TP 104. Accordingly, UE 102 may not be able to utilize these reference signals transmitted by TP 106 timing synchronization with TP 106.

Additionally, as the TPs in a CoMP configuration may be located at physically different locations (i.e. at separate eNBs and/or RRHs), quasi co-location of CRS antenna ports can no longer be assumed. Regarding the specific example of DPS CoMP network 100, UE 102 may not be able to assume that the antenna port transmitting PDCCH data, such e.g. one of CRS antenna ports 0-3 of serving cell 104, is quasi co-located with the antenna port transmitting PDSCH data, such as e.g. one of CSI-RS antenna ports 15-22 of TP 106.

Furthermore, one or more TPs in a CoMP scheme may not transmit any CRS, therefore rendering CRS-based timing synchronization therewith unfeasible.

Due to these restrictions on CRS-based timing synchronization, it may be more effective for TM10 UE type-B to utilize CSI-RS for timing synchronization, which may additionally be used by UEs for channel state estimation reporting and feedback. TPs in a JP CoMP scheme may transmit a NZP-CSI-RS pattern according to a specific NZP-CSI-RS configuration. Accordingly, TPs may transmit a periodic pattern of NZP-CSI-RS using an assigned set of REs over a sequence of CoMP subframes. The TPs associated with each PQI index may be configured to utilize a distinct set of REs to transmit NZP-CSI-RS, and accordingly a TM10 UE type-B may be able to uniquely receive a distinct NZP-CSI-RS configuration from the TP(s) associated with each PQI index during each subframe.

TM10 UE type-B may perform timing synchronization tracking for each PQI index by receiving and processing the respective NZP-CSI-RS configuration transmitted by the TP(s) of each PQI index. As previously indicated, a TM10 UE type-B may perform timing synchronization by tracking an NZP-CSI-RS-based timing offset estimate based on PQI indices specified by the network for each CoMP subframe. A TM10 UE type-B may thus identify and update an NZP-CSI-RS-based timing offset estimate for each PQI index in a CoMP scheme, thereby maintaining a CSI-RS-based timing offset estimate for each TP without explicit knowledge of the identity of each TP.

A UE may then execute downlink reception during each CoMP subframe by utilizing the NZP-CSI-RS-based timing offset estimate associated with the PQI index specified by the network in relation to the current CoMP subframe, such as e.g. by selecting the related NZP-CSI-RS-based timing offset estimate based on the specified PQI index and applying the selected NZP-CSI-RS-based timing offset estimate in phase de-rotation for demodulation of PDSCH data.

However, the estimation range of NZP-CSI-RS-based timing offset estimation may be limited compared to the timing offset range of CRS-based timing offset estimation due to the comparatively sparse allocation of REs containing NZP-CSI-RSs in the assigned NZP-CSI-RS configurations.

Accordingly, each of TPs 104-108 may transmit a sequence of NZP-CSI-RS according to an assigned NZP-CSI-RS configuration. As previously indicated, the scenario detailed herein regarding DPS CoMP network 100 is exemplary, and while the related description may assume only one TP per PQI index it is further understood that the parameter sets may be configured such that more than one TP maps to a single PQI index. It is appreciated that the following description is demonstrative in nature, and thus may be similarly applied to further scenarios in which more than one TP maps to a single PQI index.

In the exemplary scenario of DPS CoMP network 100, each of TPs 104-108 may be mapped to a PQI index, which may be specified by the parameter sets configured by higher layers UE 102 may receive the parameter set and PQI information via Radio Resource Control (RRC) signaling, and thus may be able to determine an NZP-CSI-RS-configuration corresponding to each PQI index. As previously indicated, UE 202 may thus be able to determine a distinct NZP-CSI-RS configuration corresponding to each PQI index, and thus may be able to determine an NZP-CSI-RS-based timing offset estimate for each PQI index (which may correspond to more than one TP) based on NZP-CSI-RS configurations received during each CoMP subframe.

Figure 2:
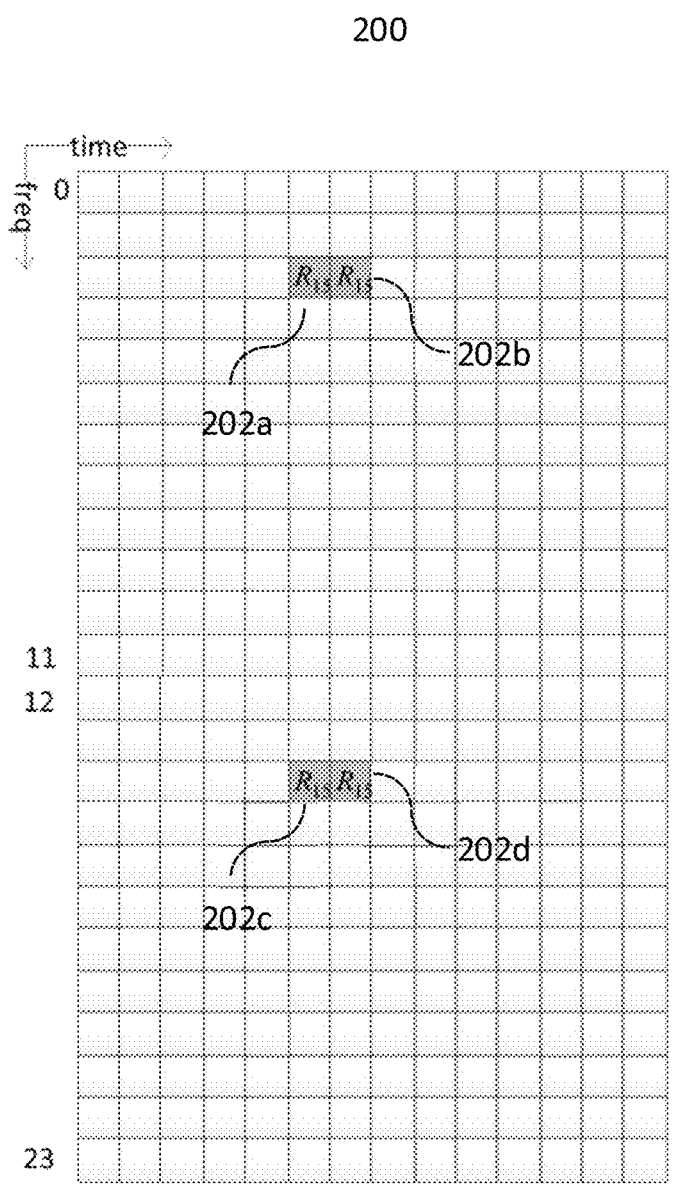
FIG. 2 shows a time-frequency resource grid.

FIG. 2 shows an exemplary illustration of resource grid 200. It is appreciated that resource grid 200 may correspond to a resource grid corresponding to an antenna port in LTE networks, where the vertical index of each RE corresponds to a subcarrier used for Orthogonal Frequency Division Multiplexing (OFDM) transmissions and the horizontal index of each RE corresponds to an OFDM symbol in time. Resource grid 200 may correspond to an RE allocation for an NZP-CSI-RS configuration for a TP operating in a CoMP scheme, such as e.g. one of TPs 104-108. Resource grid 200 may correspond to the RE mapping for an NZP-CSI-RS configuration on a single antenna port (AP) of TP 104 with a normal cyclic prefix (CP), e.g. antenna port 15 as depicted in FIG. 2.

Each of TPs 104-108 may transmit an NZP-CSI-RS configuration corresponding to the NZP-CSI_RS configuration associated with the PQI index of each TP. Each of TPs 104-108 may be configured to utilize a different set of REs. As illustrated in resource grid 200, TP 106 may transmit NZP-CSI-RS on REs 202a-202d. TPs 104 and 108 may therefore transmit respective NZP-CSI-RS configurations where each respective NZP-CSI-RS configuration uses a set of REs at different time-frequency locations on a common resource grid than REs 202a-202d.

As previously indicated, each TP may be associated with a parameter set, where each parameter set is configured by higher layers and uniquely identified by a PQI index. Accordingly, UE 102 may be able to determine the specific RE allocation for the NZP-CSI-RS configuration of each of PQI index. UE 102 may thus be able to measure and perform timing synchronization on each NZP-CSI-RS configuration using the connected RE allocation.

TM10 UE type-B may need to perform timing synchronization tracking using NZP-CSI-RS configurations transmitted from multiple TPs, i.e. from each of the TP(s) associated with each PQI index For example, in order to effectively receive PDSCH data from each of TPs 104-108 in a DPS configuration, UE 102 may need to maintain timing synchronization with each of TPs 104-108. UE 102 may have several options to compute timing offset estimates to use for timing synchronization with each of TPs 104-108, including DMRS, CSI-RS, and CRS. Due to the aforementioned disadvantages of CRS and the accuracy issues of DMRS detailed below, UE 102 may select to utilize NZP-CSI-RS to compute timing offset estimates.

Timing synchronization may be further complicated in scenarios where more than one TP is mapped to a single PQI index. As opposed to attempting to uniquely associated each of TPs 204-208 with an NZP-CSI-RS configuration to calculate an timing offset estimate for each TP, UE 202 may instead simply calculate an timing offset estimate for each PQI index, where each PQI index may correspond to one or more TPs. UE 202 may thus maintain tight timing synchronization by relying on identifying each NZP-CSI-RS configuration based on PQI index as opposed to explicitly identifying each unique TP. In an exemplary aspect of the disclosure, UE 202 may calculating timing offset estimates (or e.g. phase offset estimates) for each PQI index using received NZP-CSI-RS configuration.

Although it is appreciated that only one of TPs 104-108 may transmit PDSCH data during a single subframe in a DPS configuration, each of TPs 104-108 may transmit an NZP-CSI-RS configuration during each subframe according to the respective NZP-CSI-RS configuration index of the corresponding PQI index. In addition to timing synchronization applications, UE 102 may be configured to perform measurements on each NZP-CSI-RS configuration and provide the resulting measurements back to the network, such as by identifying each measurement according to the PQI index associated with each NZP-CSI-RS configuration. The resulting measurements may be utilized to influence downlink transmissions, such as in order to select which of TPs 104-108 is to be selected as the active TP for a given subframe.

Each NZP-CSI-RS configuration may thus be configured in a manner such that the NZP-CSI-RS configuration for each PQI index utilizes a different RE allocation in the time-frequency resource grid, thereby allowing UE 102 to uniquely receive each NZP-CSI-RS configuration for each PQI index. In addition to the aforementioned measurements, UE 102 may maintain timing synchronization with the TP(s) of each PQI index (e.g. each of TPs 104-108 in the exemplary scenario of DPS CoMP network 100) by continuously receiving and processing NZP-CSI-RS configurations received from each of TPs 104-108 in order to derive an NZP-CSI-RS-based timing offset estimate associated with each PQI index (i.e. indirectly associated with each TP by way of PQI index). UE 102 may then utilize the NZP-CSI-RS-based timing offset estimate for each TP in order to receive PDSCH data during a single subframe from the active TP, such as by utilizing the NZP-CSI-RS-based timing offset estimate associated with the specified PQI index TP (corresponding to the active TP(s)) in phase de-rotation during PDSCH demodulation.

However, timing offset estimation using NZP-CSI-RS may be limited compared to timing offset estimation using CRS, which may be unavailable to TM10 UE type-B due to the aforementioned cell ID and quasi co-location issues. As shown in resource grid 200, TP 106 may only transmit NZP-CSI-RS using a single subcarrier per block of 12 subcarriers (e.g. using two REs on a single given subcarrier during a single subframe). Accordingly, the allocation of NZP-CSI-RS configurations in frequency may be considered sparse. The limited bandwidth of NZP-CSI-RS configurations may consequently limit the timing offset estimation range for timing synchronization tracking based on NZP-CSI-RS.

The timing offset estimation range of NZP-CSI-RS-based timing offset estimation may be derived as follows:

$$-\pi \leq 2\pi \cdot \varepsilon_{timing} \cdot 12\text{RE} \cdot \text{BW}_{SC} \leq \pi \quad (1),$$

where $\varepsilon_{timing}$ is a timing constraint variable, 12 RE corresponds to 12 resource elements (i.e. within a single resource block), and $\text{BW}_{sc}$ is the bandwidth per subcarrier.

With a conventional subcarrier bandwidth $\text{BW}_{sc}$=15 kHz for an LTE network, the timing offset estimation range for NZP-CSI-RS-based timing offset estimation is physically bound as [−2.78 μs, +2.78 μs]. In other words, the existing NZP-CSI-RS-based timing offset estimation is limited to producing timing offsets estimates within the range [−2.78 μs, +2.78 μs]. It is appreciated that mobile communication networks utilizing other subcarrier spacing may yield similarly adjusted timing offset estimation ranges in accordance with Equation 1.

In practice, timing synchronization between a single cell and UE is inherently dependent in part on the physical location of the UE with respect to the single cell due to signal propagation time. Downlink propagation time will be relatively short for UEs located near to the cell, while downlink propagation time will be extended for UEs located far from the cell. Specifically, downlink propagation time is approximately 3.3 us for UEs located in the cell edge of a cell with a 1 km radius.

However, it may be infeasible for cells to control downlink timing alignment targeting for the location of multiple UEs, as each UE may have a different location and accordingly a different downlink propagation time. Furthermore, additional transmission time differences may be introduced if cells are not synchronized in a near-perfect manner, thereby further contributing to timing alignment issues.

Consequently, there exists no guarantee that the timing offset for a TP in a CoMP scenario will be within the given NZP-CSI-RS-based timing offset estimation range of [−2.78 μs, +2.78 μs]. Reception of PDSCH subframes by TM10 UE type-B with timing offsets that fall outside of the NZP-CSI-RS-based timing offset estimation range may cause significant performance degradation, as the timing offset estimate used for phase de-rotation in PDSCH demodulation will be incorrect.

In an aspect of the disclosure, a TM10 UE type-B may be configured to estimate the timing offset for each possible PQI index (e.g. corresponding to TPs 104-108 according to the specified parameter set for each PQI index) based on the NZP-CSI-RS configuration transmitted by each of TPs 104-108 according to the respective PQI index of each NZP-CSI-RS configuration. Assuming the actual timing offsets of each TP lie within the timing offset estimation range given by Equation 1, UE 102 may effectively perform timing offset estimation and time tracking using NZP-CSI-RS. In many scenarios, NZP-CSI-RS may offer a suitable approach for timing synchronization in TM10 UE type-B.

However, for scenarios in which TPs have large timing offsets, the actual timing offset for one or more of TPs 104-108 may fall outside of the timing offset estimation range of NZP-CSI-RS-based timing offset estimation. A TM10 UE type-B using NZP-CSI-RS-based timing offset estimation may consequently not be able to obtain an accurate timing offset estimation for one or more of TPs 104-108, and accordingly any PDSCH transmissions demodulated using an inaccurate timing offset estimation may be severely corrupted. As is introduced below in FIG. 3, UE 102 may instead utilize Demodulation Reference Signal (DMRS)-based timing offset estimation in coordination with the aforementioned NZP-CSI-RS-based timing offset estimation to ensure greater accuracy in timing offset estimation for TPs 104-108.

Figure 3:
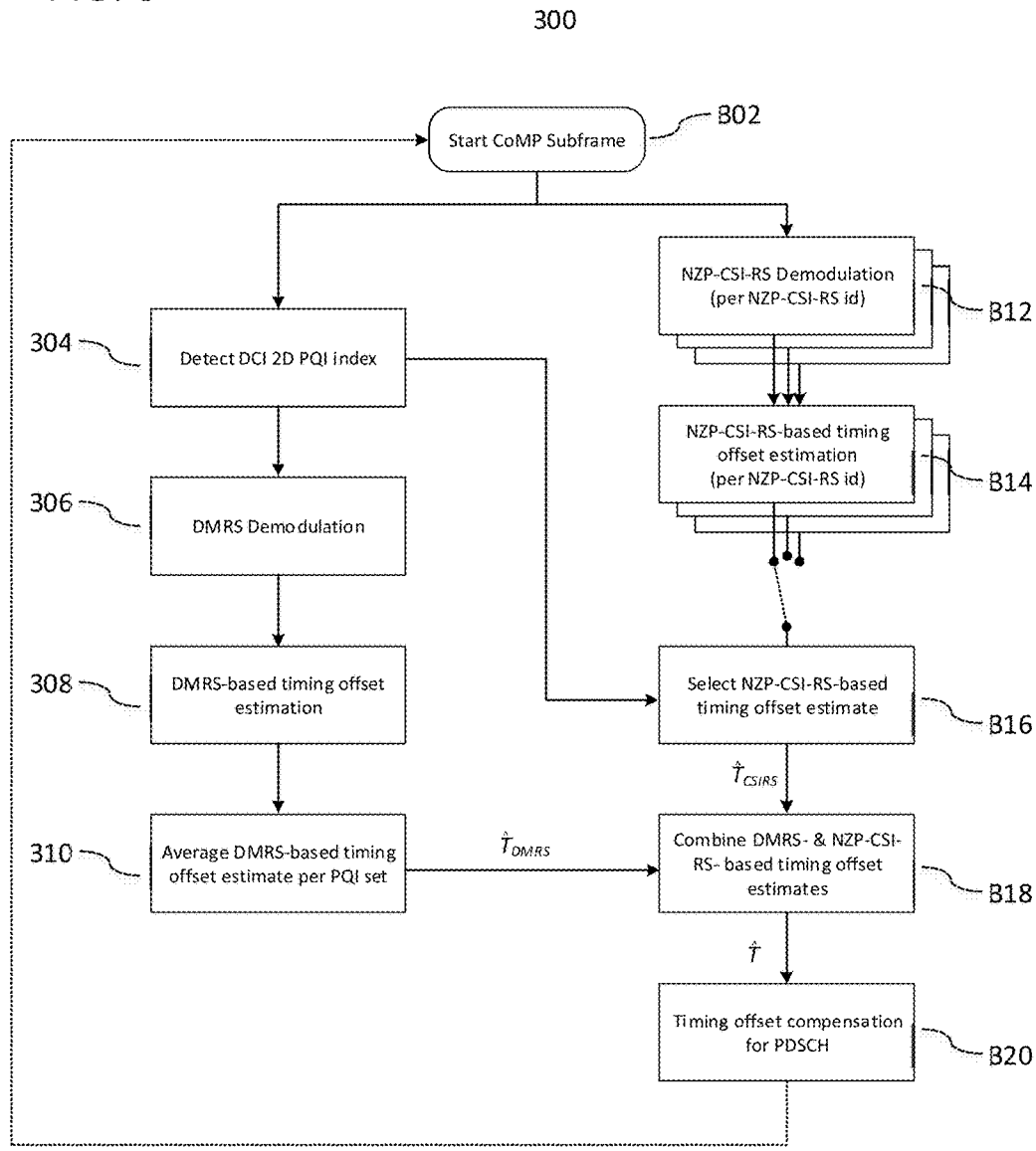
FIG. 3 shows a flow diagram illustrating a timing offset estimation process; according to an exemplary aspect of the disclosure.

FIG. 3 shows a flow chart illustrating method 300. Method 300 may be utilized to obtain more accurate timing offset estimations by offering an expanded timing offset estimation range than conventional NZP-CSI-RS-based timing offset estimation. Method 300 may be performed by a mobile terminal such as UE 102 participating in a CoMP network, such as DPS CoMP network 100. It is appreciated that method 300 may be particularly applicable to TM10 UE type-B, which may not be able to utilize CRS-based timing offset estimation due to reduced quasi co-location assumptions. Nevertheless it is understood that any UE operating according to a transmission mode including CSI-RS and Demodulation Reference Signals (DMRS) may be able to perform aspects of time synchronization utilizing the approach of method 300.

Specifically, method 300 may utilize Demodulation Reference Signal (DMRS)-based timing offset estimation in coordination with NZP-CSI-RS-based timing offset estimation in order to produce aggregate timing offset estimates with increased accuracy. Similarly to NZP-CSI-RS, DMRS may be transmitted by a cells configured to perform downlink transmissions according to TM10 (in addition to TM9 as of 3GPP Release 11), such as on antenna ports 7-14 along with PDSCH data traffic. However, as opposed to the periodic transmission pattern associated with NZP-CSI-RS configurations (e.g. as detailed regarding FIG. 3), cells may only transmit DMRS during subframes where the cell is transmitting PDSCH data to a UE. The UE receiving the downlink PDSCH may utilize the received DMRS to assist in demodulating the PDSCH data traffic, such as for channel estimation in receiving downlink signals transmitted according to transmit diversity or spatial multiplexing schemes.

Cells may transmit DMRS over multiple subcarriers per block of 12 subcarriers, such as e.g. every 5 subcarriers, and accordingly frequency allocation of DMRS configurations may have comparatively greater bandwidth than NZP-CSI-RS configurations. Accordingly, as timing offset estimates may be obtained based on phase rotation measurements over frequency tones, DMRS-based timing offset estimation may offer a greater timing offset estimation range than NZP-CSI-RS-based timing offset estimation. For example, DMRS may be transmitted every 5 subcarriers as opposed to the 12 subcarrier distribution of NZP-CSI-RS. Accordingly, DMRS-based timing offset estimation may offer an expanded timing offset estimation range of [−6.66 μs, +6.66 μs] compared to the relatively limited range of [−2.78 μs, +2.78 μs] of NZP-CSI-RS-based timing offset estimation. However, due to the inconsistent distribution in time of DMRS, the accuracy of DMRS-based timing offset estimation may be relatively poor compared to NZP-CSI-RS based timing offset estimation. Timing offset estimation based solely upon DMRS may thus ill-suited for practical use, as DMRS may only be received during subframes in which PDSCH data is scheduled.

The number of occasions in which DMRS-based timing offset estimation can be applied may be limited in CoMP scenarios, especially for timing tracking purposes on nonactive TP(s). In a CoMP scheme, only the TP(s) that are currently transmitting PDSCH to a UE may transmit DMRS, i.e. only the active TP(s) in a DPS scheme may transmit DMRS to a given TM10 UE type-B during a given subframe. For example, in DPS CoMP network 100 only the active TP of TPs 104-108, e.g. TP 106 in the above detailed examples, may transmit DMRS to UE 102 along with the PDSCH data. UE 102 may therefore only be able to perform updated timing offset estimation based on DMRS for one TP of TPs 104-108, i.e. the active TP, as only active TP may be transmitting DMRS.

Despite the associated drawbacks of timing offset estimation using only DMRS, it may be advantageous to utilize DMRS in conjunction with NZP-CSI-RS-based timing offset estimation due to the expanded timing offset estimation range offered by DMRS. As previously indicated, while the timing offset estimation range of NZP-CSI-RS-based timing offset estimation may be limited to [−2.78 µs, +2.78 µs], DMRS-based timing offset estimation may offer an expanded timing offset estimation range of [−5.56 µs, +5.56 µs], i.e. expanding the corresponding phase offset estimation range from [−π, +π] to [−2π, +2π].

Timing offset estimation may be conventionally based on phase rotation measurements of reference signals over multiple frequency tones (i.e. subcarriers). A measured phase rotation is then translated into the time domain as a timing offset. A timing offset estimation may be written in the frequency domain as a phase rotation estimate $\hat{\theta}_{rs}$ as follows:

$$\hat{\theta}_{rs} = \text{angle}\left(\sum_{i=0}^{N_{sample}-1} Y_i Y_{i+1}^*\right) / N_{REgap}, \quad (2)$$

where angle(·) gives the phase of the argument, $Y_i$ is the $i^{th}$ sample of the reference signal over frequency tones, $N_{sample}$ is the number of reference signal samples in the frequency domain, and $N_{REgap}$ is the number of RE gaps between sample $Y_i$ and $Y_{i+1}$, which may consequently be dependent on the frequency distribution of based on the type of reference signal of $Y_i$. As previously detailed, NZP-CSI-RS configurations may be sparsely distributed in the frequency domain, and accordingly may have $N_{REgap\_CSIRS} = 12$ corresponding to the distribution of a single subcarrier allocated to CSI-RS per block of 12 subcarriers. In contrast, $N_{REgap\_DMRS}$ may be $N_{REgap\_DMRS}=5$ for DMRS, corresponding to an allocation of one subcarrier per blocks of 5 subcarriers for DMRS.

As previously detailed, the timing offset estimation range of NZP-CSI-RS-based timing offset estimation may be projected to the range [−π, +π] in the discrete sample domain according to Equation 1. However, this range may be expanded to [−2π, +2π] through the use of DMRS-aided timing offset estimation. Accordingly, both NZP-CSI-RS-based and DMRS-based timing offset estimates may be aggregated to expand the timing offset from [−2.78 µs, +2.78 µs] to [−5.56 µs, +5.56 µs]. The increased timing offset estimation range may therefore reduce the likelihood that the timing offset estimate associated with a TP in a JP CoMP scenario falls outside of the timing offset range, thereby reducing the performance issues with incorrect timing offset estimates.

Method 300 illustrates a method for performing DMRS-aided NZP-CSI-RS-based timing offset estimation according to an aspect of the disclosure. Method 300 may be appropriate for CoMP scenarios such as DPS or JT CoMP schemes that involve receiving PDSCH data traffic from multiple TPs over time. Method 300 may provide an approach to accurately estimate the timing offset for each PQI index, such as TPs 104-108 relative to UE 102 in FIG. 1, such that a TM10 UE type-B receiving PDSCH data traffic over a CoMP network may accurately track timing offsets over time.

As shown in FIG. 3, method 300 may include two calculation paths, where each calculation path is associated with DMRS-based timing offset estimation or NZP-CSI-RS-based timing offset estimation. Both the DMRS-based timing offset estimation and the NZP-CSI-RS-based timing offset estimation may be performed in order to estimate the timing offset associated with the specified PQI index, i.e. the active TP(s) performing transmission of the PDSCH data traffic in the current subframe as specified as the PQI index in PDCCH DCI Format 2D. The resulting timing offsets may be aggregated to determine a final timing offset estimate for the specified PQI index to be used for timing offset compensation. In addition to obtaining a timing offset estimate for the active TP for the current subframe, method 300 may also perform timing offset tracking on one or more additional PQI indices, i.e. the remaining PQI indices not specified as the PQI index in PDCCH DCI Format 2D in order to maintain tight synchronization with the TP(s) of each PQI index for potential use in subsequent subframes.

As previously detailed, UE 102 may receive multiple NZP-CSI-RS configurations during each CoMP subframe, where each NZP-CSI-RS configuration is associated with one or more TP(s) by virtue of PQI index. Each NZP-CSI-RS configuration may thus be transmitted by one or more of TPs 104-108. As previously indicated, for exemplary purposes DPS CoMP network 100 may only have a single TP allocated to each PQI index, although it may be possible for CoMP networks to allocate multiple TPs to each PQI index.

UE 102 may receive only one DMRS pattern during a CoMP subframe as only the TP(s) corresponding to the specified PQI index (i.e. the active TP(s) for the current subframe) may be transmitting PDSCH data traffic to UE 202. Accordingly, in order to utilize both a received NZP-CSI-RS configuration and a received DMRS configuration for timing offset estimation for the active TP(s) in the current subframe, UE 102 must first identify which received NZP-CSI-RS configuration corresponds to the received DMRS configuration, i.e. which NZP-CSI-RS configuration is associated with the specified PQI index, and is thus associated with the received DMRS configuration. In essence, UE 102 may rely on quasi co-location assumptions in order to identify the NZP-CSI-RS configuration that is co-located with the DMRS configuration during each subframe.

As previously detailed, UE 102 may receive PDCCH data from the serving cell during each CoMP subframe, which may be in a particular Downlink Control Indicator (DCI) format. In accordance with UE 102 configured as a TM10 UE type-B, the PDCCH data may include DCI Format 2D data, which may specify a PQI index for the current subframe. UE 102 may then assume that data traffic receive from CSI-RS antenna ports 7-14 associated with the specified PQI index are quasi co-located with DMRS antenna port 15-22. In other words, UE 102 may assume that the NZP-CSI-RS configuration associated with the specified PQI index for the current subframe is quasi co-located with the DMRS configuration received during the current subframe. UE 102 may then identify the specified NZP-CSI-RS configuration based on the specified PQI index and assume that this NZP-CSI-RS configuration is associated with the received DMRS configuration by way of quasi co-location.

The PQI index identifying which NZP-CSI-RS configuration is quasi co-located with the received DMRS configuration may only be applicable on a per-subframe basis, as the active TP(s) (i.e. the TP)s__ transmitting the DMRS configuration along with PDSCH data during the current subframe corresponding to the specified PQI index) may similarly switch for each subframe. Accordingly, UE 102 may only apply the quasi co-location assumption regarding NZP-CSI-RS and DMRS configurations garnered from the PQI index in DCI Format 2D data during the current subframe.

As a result, UE 102 may be able to determine which NZP-CSI-RS configuration is quasi co-located with the received PDSCH and by extension the received DMRS configuration for each subframe. UE 102 may therefore perform timing offset estimation based on the received DMRS configuration and the NZP-CSI-RS configuration specified by way of PQI index.

Method 300 may therefore detect the PQI index for the current CoMP subframe based on DCI Format 2D PDCCH data in 304. After detecting the PQI index in 304, UE 102 may hold the identified PQI index for later use in method 300, such as in 316.

UE 102 may proceed to 306 to demodulate the received DMRS, such as by receiving and demodulating the associated downlink signal using radio frequency circuitry. UE 102 may then perform DMRS-based timing offset estimation in 308, such as by applying processing circuitry to perform a phase rotation between different samples of the received DMRS in the frequency domain according to Equation 2. UE 102 may therefore obtain a DMRS-based timing offset estimate for the current PDSCH, which thus be associated with the active TP(s) for the current subframe by virtue of PQI index.

In addition to obtaining a DMRS-based timing offset estimate for the current CoMP subframe, UE 102 may be configured to store DMRS-based timing offset estimates for one or more previous CoMP subframes, such as a historical average. For example, UE 102 may be configured to store a historical DMRS-based timing offset estimate for each PQI index, and to update the corresponding historical DMRS-based timing offset estimate upon determining a DMRS-based timing offset estimate for the PQI index of the current subframe. UE 102 may thus update one of the historical DMRS-based timing offset estimates during each CoMP subframe, i.e. by calculating a DMRS-based timing offset estimate for the current subframe and updating the corresponding historical DMRS-based timing offset estimate based on the specified PQI index for the current subframe. As previously indicated, each historical DMRS-based timing offset estimate may be e.g. a historical average based on DMRS-based timing offset estimates for one or more previous CoMP subframes. Additionally, the historical DMRS-based timing offset estimate may be calculated e.g. using a forgetting parameter, such that the most recently obtained DMRS-based timing offset estimates are more heavily considered in the historical DMRS-based timing offset estimate than less recent DMRS-based timing offset estimates.

Accordingly, UE 102 may average the DMRS-based timing offset estimate obtained in 308 with a corresponding historical DMRS-based timing offset estimate in 310, such as by retrieving a historical DMRS-based timing offset estimate associated with the same PQI index as the current CoMP subframe. UE 102 may then further utilize the resulting average DMRS-based timing offset in method 300.

Simultaneous to performing DMRS demodulation and DMRS-based timing offset estimation and averaging in 306-310, UE 102 may perform NZP-CSI-RS demodulation for each NZP-CSI-RS configuration. As previously detailed, UE 102 may receive an NZP-CSI-RS configuration from each of TPs 104-108 during the current subframe, which UE 102 may distinguish based on PQI index. As specified by the DCI Format 2D PQI index obtained in 304, UE 102 may assume that one of the NZP-CSI-RS configurations is quasi co-located with received PDSCH data and a received DMRS configuration.

However, UE 102 may perform NZP-CSI-RS demodulation in 312 and NZP-CSI-RS-based timing offset estimation in 314 for each PQI index, i.e. for each received NZP-CSI-RS configuration. UE 102 may therefore obtain a new NZP-CSI-RS-based timing offset estimate for each PQI index during each CoMP subframe in 314. While only one of the obtained NZP-CSI-RS-based timing offset estimates may be applicable for PDSCH demodulation in the current CoMP subframe, UE 102 may nevertheless constantly update a historical NZP-CSI-RS-based timing offset estimate for each PQI index during each subframe. In this manner, UE 102 may perform timing synchronization tracking for each PQI index using each received NZP-CSI-RS configuration, thereby maintaining a consistently accurate NZP-CSI-RS timing offset for each PQI index.

Similarly to as performed with the received DMRS configuration, UE 102 may store an NZP-CSI-RS-based timing offset estimates for one or more previous CoMP subframes for each PQI index, such as by storing a historical average NZP-CSI-RS-based timing offset estimate for each PQI index. Upon obtaining NZP-CSI-RS-based timing offset estimates for each PQI index for the current CoMP subframe in 314, UE 102 may update each corresponding historical NZP-CSI-RS-based timing offset estimate, such as e.g. by averaging the NZP-CSI-RS-based timing offset estimates obtained in 314 with the historical NZP-CSI-RS-based timing offset estimates. While UE 102 may only apply one of the historical NZP-CSI-RS-based timing offset estimates for PDSCH demodulation in the current CoMP subframe, UE 102 may nevertheless maintain a current NZP-CSI-RS-based timing offset estimate for each PQI index that is constantly updated based on each received NZP-CSI-RS configuration.

UE 102 may thus obtain an NZP-CSI-RS-based timing offset estimate for each PQI index in 314, where the NZP-CSI-RS-based timing offset estimates may be e.g. based on historical NZP-CSI-RS-based timing offset estimates. UE 102 may then select the NZP-CSI-RS-based timing offset estimate to be utilized for PDSCH demodulation in the current subframe. Specifically, UE 102 may select the NZP-CSI-RS-based timing offset estimate according to the PQI index specified obtained in 304, which as previously detailed may be assumed to be quasi co-located with received PDSCH data and a received DMRS configuration. Due to the associated quasi co-location assumption, UE 102 may be able to utilize the selected NZP-CSI-RS-based timing offset estimate in 316 along with the DMRS-based timing offset estimate obtained in 310 to perform DMRS-aided NZP-CSI-RS-based timing offset estimation for the current CoMP subframe.

Accordingly, UE 102 may combine the DMRS-based timing offset estimate obtained in 310 and the selected NZP-CSI-RS-based timing offset estimated obtained in 314 and selected in 316. UE 102 may then utilize the resulting DMRS-aided NZP-CSI-RS-based timing offset estimate to perform timing offset compensation for the received PDSCH data traffic in 320.

As previously detailed, NZP-CSI-RS-based timing offset estimation may provide a high degree of accuracy but may suffer from a narrow timing offset estimation range spanning from [−2.78 μs, +2.78 μs] (i.e. [−π, +π] in the discrete sample domain). In contrast, DMRS-based timing offset estimation may provide a low degree of accuracy but may offer an increased timing offset estimation range. UE 102 may thus utilize DMRS-based timing offset estimation to expand the range of NZP-CSI-RS-based timing offset estimation to [−5.56 μs, +5.56 μs] (i.e. [−2π, +2π] in the discrete sample domain) without sacrificing accuracy.

Figure 4:
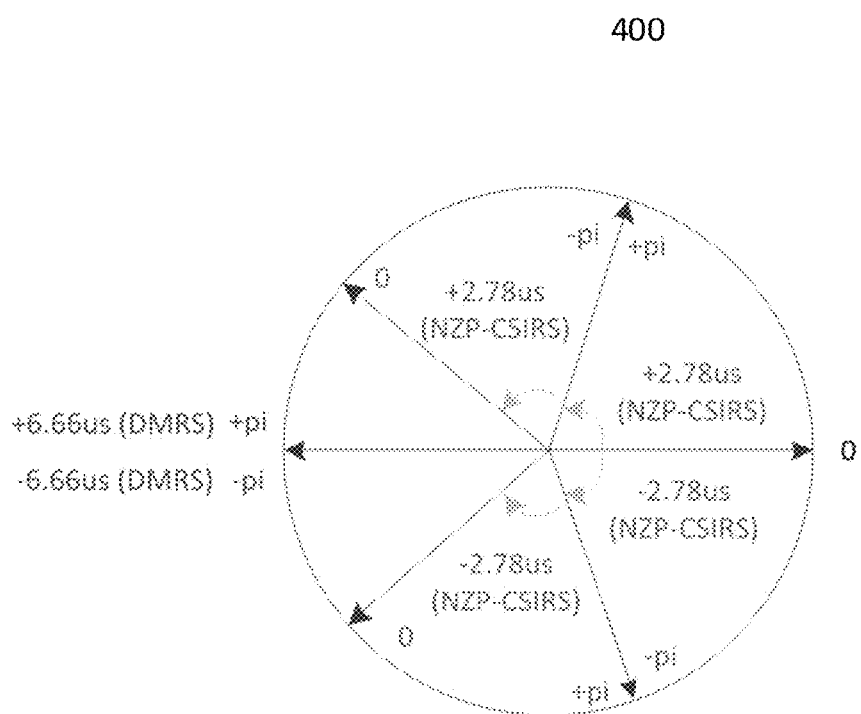
FIG. 4 shows a unit circle illustrating timing and phase offset estimation ranges.

As shown in unit circle 400 of FIG. 4, DMRS-based timing offset estimation may provide a timing offset estimation range of [−6.66 μs, +6.66 μs], which projects around the extent of unit circle 400 as depicted in FIG. 4. NZP-CSI-RS-based timing offset estimation may provide a timing offset estimation range of [−2.78 μs, +2.78 μs], which may result in a "wrapped" distribution around unit circle 400 within the associated timing offset estimation range of DMRS-based timing offset estimation projected onto unit circle 400.

Due to the associated phase wrapping property of timing offset estimation based on phase rotation, timing offsets in the range of [−5.56 μs, −2.78 μs] will be projected into the range [0 μs, +2.78 μs] by NZP-CSI-RS-based timing offset estimation. Similarly, timing offsets in the range of [+2.78 μs, +5.56 μs] will be projected into the range [−2.78 μs, 0 μs] by NZP-CSI-RS-based timing offset estimation.

Accordingly, the resulting NZP-CSI-RS-based timing offset estimates may be offset from the correct timing offsets by ±π, resulting in an incorrect timing offset estimate. PDSCH demodulation performed using these incorrect NZP-CSI-RS-based timing offset estimates, such as by applying the NZP-CSI-RS-based timing offset estimate in phase de-rotation of PDSCH data, will accordingly result in corruption of the demodulated PDSCH data.

As shown in FIG. 4, the range of DMRS-based timing offset estimation may extend from [−6.66 μs, +6.66 μs]. UE 102 may thus utilize the DMRS-based timing offset estimate in order to determine whether an obtained NZP-CSI-RS-based timing offset estimate has been offset by ±2.78 μs (i.e. ±π in the phase domain) and to perform any necessary correction in order to shift the NZP-CSI-RS-based timing offset estimate into the correct range.

Accordingly, method 300 may combine the DMRS-based timing offset of 308 and the selected NZP-CSI-RS-based timing offset estimate of 316 in 318 by comparing the sign of the DMRS-based timing offset and selected NZP-CSI-RS-based timing offset estimate in order to determine whether the NZP-CSI-RS-based timing offset estimate should be shifted into the correct range. If the sign of the DMRS-based timing offset estimate agrees with the selected NZP-CSI-RS-based timing offset estimate, 318 may utilize the selected NZP-CSI-RS-based timing offset estimate as the DMRS-aided NZP-CSI-RS-based timing offset estimate for the current subframe. However, if the sign of the DMRS-based timing offset estimate does not agree with the selected NZP-CSI-RS-based timing offset estimate, 318 may add either +2.78 or −2.78 to the additive inverse of the selected NZP-CSI-RS-based timing offset estimate depending on whether the sign of the DMRS-based timing offset estimate is positive or negative, respectively.

In summary, 318 may select the DMRS-aided NZP-CSI-RS-based timing offset estimate $\hat{T}$ for the current subframe to be used in timing offset compensation for the current subframe as follows:

$$\hat{T} = \hat{T}_{CSIRS} \text{ if } (+\hat{T}_{CSIRS}, +\hat{T}_{DMRS}) \tag{3a},$$

$$\hat{T} = \hat{T}_{CSIRS} \text{ if } (-\hat{T}_{CSIRS}, -\hat{T}_{DMRS}) \tag{3b},$$

$$\hat{T} = +2.78 \text{ μs} - \hat{T}_{CSIRS} \text{ if } (+\hat{T}_{CSIRS}, -\hat{T}_{DMRS}) \tag{3c},$$

$$\hat{T} = -2.78 \text{ μs} - \hat{T}_{CSIRS} \text{ if } (-\hat{T}_{CSIRS}, +\hat{T}_{DMRS}) \tag{3d},$$

where $\hat{T}_{CSIRS}$ is the NZP-CSI-RS-based timing offset estimate, $\hat{T}_{DMRS}$ is the DMRS-based timing offset estimate, $(+\hat{T}_{CSIRS}, +\hat{T}_{DMRS})$ indicates conditional expression where $\hat{T}_{CSIRS}$ has a positive (+) sign and $\hat{T}_{DMRS}$ has a positive (+) sign, and so forth.

Method 300 may thus combine the DMRS-based timing offset and the selected NZP-CSI-RS-based timing offset estimate in 318 according to Equations 3a-3d in order to obtain a DMRS-aided NZP-CSI-RS-based timing offset estimate $\hat{T}$ for the current subframe. Method 300 may then utilize the DMRS-aided NZP-CSI-RS-based timing offset estimate $\hat{T}$ in order to perform timing offset compensation for the PDSCH data received in the current subframe in 320, such as by applying the DMRS-aided NZP-CSI-RS-based timing offset estimate $\hat{T}$ in phase de-rotation.

By utilizing DMRS-based timing offset estimation to evaluate the sign of NZP-CSI-RS-based timing offset estimates and performing any requisite shift, method 300 may expand the range of NZP-CSI-RS-based timing offset estimation without sacrificing the accuracy of NZP-CSI-RS-based timing offset estimation. PDSCH demodulation may thus be improved through the use of NZP-CSI-RS-based timing offset estimates with higher accuracy.

Furthermore, it is appreciated that method 300 may be implemented in an iterative manner, and thus may be repeated for over a sequence of more than one CoMP subframe over time. Method 300 may thus determine the appropriate PQI index for the current CoMP subframe and perform the proper timing offset estimation based on the quasi co-location assumption between the specified NZP-CSI-RS configuration and received PDSCH data and DMRS configuration specified by the PQI index.

It is appreciated that UE 102 may perform method 300 in either the time or phase domain, i.e. using either timing offset estimates or phase offset estimates. It is appreciated that due to the inter-related nature of time and phase between their respective domains, time offset estimates and phase offset estimates may be transformed between the time and phase domains as follows:

$$\hat{T} = \frac{1}{2\pi} \times \hat{\theta} \times OFDMSymbolDuration, \tag{4}$$

$$\hat{\theta} = \frac{2\pi \times \hat{T}}{OFDMSymbolDuration}, \tag{5}$$

where $\hat{T}$ is the timing offset estimate, $\hat{\theta}$ is the phase offset estimate, and OFDMSymbolDuration is the duration of an OFDM symbol in time (e.g. 71.3 μs including CP length). Accordingly, it is appreciated that any of 302-320 in method 300 may be implemented in either the time or phase domain, where timing offset estimates and phase offset estimates may be translated into the other domain through the use of Equations 4 and 5.

Equations 3a-3d may be written as follows to correspond with the phase domain to determine a DRMS-aided NZP-CSI-RS-based phase offset estimate $\hat{\theta}$:

$$\hat{\theta} = \hat{\theta}_{CSIRS} \text{ if } (+\hat{\theta}_{CSIRS}, +\hat{\theta}_{DMRS}) \tag{6a},$$

$$\hat{\theta} = \hat{\theta}_{CSIRS} \text{ if } (-\hat{\theta}_{CSIRS}, -\hat{\theta}_{DMRS}) \tag{6b},$$

$$\hat{\theta} = +\pi - \hat{\theta}_{CSIRS} \text{ if } (+\hat{\theta}_{CSIRS}, -\hat{\theta}_{DMRS}) \tag{6c},$$

$$\hat{\theta} = -\pi - \hat{\theta}_{CSIRS} \text{ if } (-\hat{\theta}_{CSIRS}, +\hat{\theta}_{DMRS}) \tag{6d},$$

where $\hat{\theta}_{CSIRS}$ is the NZP-CSI-RS-based phase offset estimate, $\hat{\theta}_{DMRS}$ is the DMRS-based phase offset estimate, $(+\hat{\theta}_{CSIRS}, +\hat{\theta}_{DMRS})$ indicates conditional expression where $\hat{\theta}_{CSIRS}$ has a positive (+) sign and $\hat{\theta}_{DMRS}$ has a positive (+) sign, and so forth.

Figure 5:
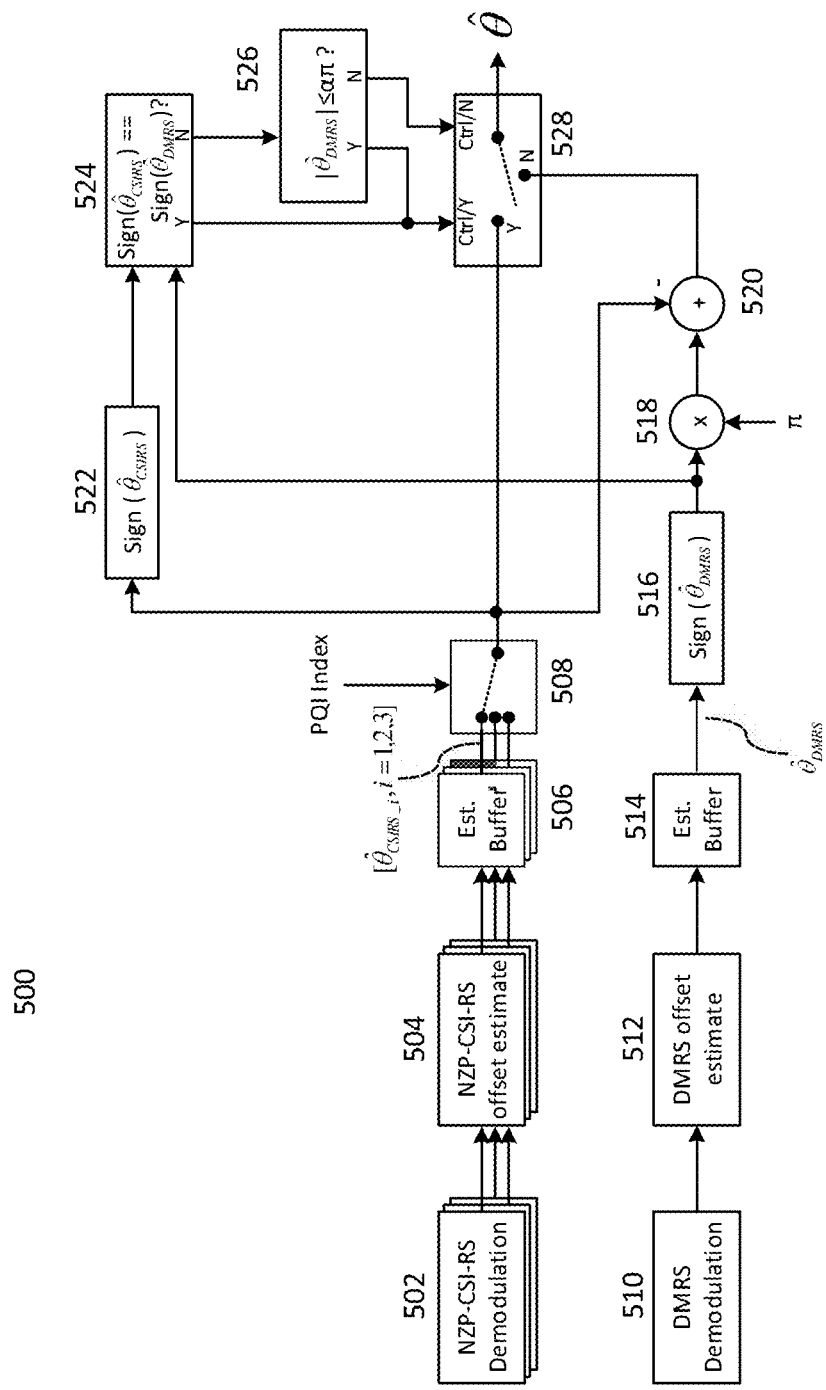
FIG. 5 shows a block diagram illustrating a phase offset estimation process.

FIG. 5 shows block system 500 further illustrating an approach for utilizing received DMRS to improve the range of NZP-CSI-RS-based timing offset estimation, such as by obtaining a DMRS-aided NZP-CSI-RS-based timing offset estimate. It is appreciated that aspects of block system 500 may be similar in nature to the approach detailed regarding method 300. Block system 500 may similarly be implemented by UE 102, and accordingly one or more internal components of UE 102 may perform similar functions as to one or more of blocks 502-526.

Block system 500 may seek to obtain a phase offset estimate $\hat{\theta}$ corresponding to a timing offset estimate $\hat{T}$ to be used in timing compensation for PDSCH reception in a CoMP subframe. Accordingly, block system 500 may be suitable for use in a CoMP network in order to maintain timing synchronization with one or more TPs, such as e.g. TPs 104-108 of FIG. 1. Block system 500 may thus receive a PQI index as DCI Format 2D PDCCH data indicating an NZP-CSI-RS configuration that may be assumed to be quasi co-located with PDSCH data and a received DMRS configuration in the current subframe. Block system 500 may then obtain a phase offset estimate $\hat{\theta}$ for the specified PQI index based on the indicated NZP-CSI-RS configuration and received DMRS configuration, where the phase offset estimate $\hat{\theta}$ may be subsequently used for timing compensation in reception of the PDSCH data.

As detailed regarding method 300, there may be up to four possible values for the PQI index, where each PQI index corresponds to a respective parameter set associated with a unique NZP-CSI-RS configuration and one or more TPs, e.g. corresponding to a TP in a CoMP scheme. The specified PQI index contained in DCI Format 2D PDCCH data may be different for each CoMP subframe, which may correspond to switching of the active TP(s) between TPs 104-108. Block system 500 may not be aware of the explicit identity of each TP, i.e. may not have explicit knowledge of which of TPs 104-108 is the active TP(s). Instead, block system 500 may be able to identify an NZP-CSI-RS configuration that is quasi co-located with received PDSCH data and a received DMRS configuration, which may indirectly correspond to identification of which NZP-CSI-RS configuration is associated with the active TP for the current subframe. Block system 500 may be able to able to maintain timing synchronization based on received PQI indices, which may have the effect of maintaining timing synchronization with each TP due to the relationship between each PQI index and each TP.

By obtaining a phase offset estimate for the specified PQI index for the current CoMP subframe, block system 500 may maintain tight timing synchronization with the TP associated with the specified PQI index. Block system 500 may obtain the phase offset estimate to be utilized for the current CoMP subframe based on both a received DMRS configuration and the NZP-CSI-RS configuration identified by the PQI index. Block system 500 may additionally obtain a phase offset estimate during each CoMP subframe for the remaining PQI indices based on the other NZP-CSI-RS configurations in order to maintain timing synchronization with each associated TP for use in later CoMP subframes, e.g. by maintaining a historical NZP-CSI-RS configuration for each PQI index for later use dependent on the PQI index specified in later subframes.

Block system 500 may receive one or more NZP-CSI-RS configurations in NZP-CSI-RS demodulation block 502. Each received NZP-CSI-RS configuration may correspond to a PQI index, which may correspond to one of TPs 104-108. NZP-CSI-RS demodulation block 502 may demodulate each received NZP-CSI-RS configuration.

NZP-CSI-RS offset estimation block 504 may then perform NZP-CSI-RS-based offset estimation using the demodulated NZP-CSI-RS configurations provided by NZP-CSI-RS demodulation block 502. NZP-CSI-RS offset estimation block 504 may e.g. perform phase rotation of NZP-CSI-RS samples over multiple frequency tones in order to obtain an NZP-CSI-RS-based phase offset estimate for each received NZP-CSI-RS. In the exemplary scenario detailed in FIG. 1, there may exist three TPs in exemplary DPS CoMP network 100. Accordingly, there may exist three possible PQI indices, where each PQI index corresponds to one of TPs 104-108. Block system 500 may not have explicit knowledge of which of TPs 104-108 corresponds to each PQI index, in particular in CoMP scenarios where more than one TP maps to a single PQI index. However, as PQI index assignments may be assumed to be static, block system 500 may rely on the PQI indices to identify and differentiate between TPs 104-108 and maintain synchronization therewith without having explicit knowledge of the identity of each of TPs 104-108.

NZP-CSI-RS offset estimation block 504 may obtain three NZP-CSI-RS-based phase offset estimates $\hat{\theta}_{CSIRS\_i}$, i={1, 2, 3}, where each NZP-CSI-RS-based phase offset estimate $\hat{\theta}_{CSIRS\_i}$ uniquely corresponds to a respective $i^{th}$ PQI index (which may each in practice be a 2-bit identifier of the set {00, 01, 10, 11}. Estimation buffer block 506 may receive the NZP-CSI-RS-based phase offset estimates and may store each NZP-CSI-RS-based phase offset estimate in a buffer. Estimation buffer block 506 may store each NZP-CSI-RS-based phase offset estimate based on the PQI index associated with each NZP-CSI-RS-based phase offset estimate, i.e. based on the PQI index associated with the NZP-CSI-RS configuration utilized to obtain each NZP-CSI-RS-based phase offset estimate.

Estimation buffer block 506 may store a historical NZP-CSI-RS-based phase offset estimate for each PQI index, such as e.g. by averaging each of the NZP-CSI-RS-based phase offset estimates provided by NZP-CSI-RS offset estimation block 504 with a historical NZP-CSI-RS-based phase offset estimate based on one or more previous NZP-CSI-RS-based phase offset estimates. Estimation buffer block 506 may thus update a historical NZP-CSI-RS-based phase offset estimate associated with each PQI index based on the NZP-CSI-RS-based phase offset estimates provided by NZP-CSI-RS offset estimation block 504. Accordingly, estimation buffer block 506 may maintain a current NZP-CSI-RS-based phase offset estimate [$\hat{\theta}_{CSIRS_i}$; i=1, 2, 3] for each PQI index, and may update the NZP-CSI-RS-based phase offset estimate [$\hat{\theta}_{CSIRS_i}$; i=1, 2, 3] for each PQI index during each CoMP subframe using newly obtained NZP-CSI-RS-based phase offset estimates based on the =NZP-CSI-RS configurations during each CoMP subframe.

Estimation buffer block 506 may then provide each NZP-CSI-RS-based phase offset estimate $\hat{\theta}_{CSIRS\_i}$ to selection block 508. Selection block 508 may additionally receive a PQI index as input, which may the PQI index specified in the DCI Format 2D PDCCH data for the current subframe. As previously detailed, the specified PQI index may identify an NZP-CSI-RS resource that may be assumed to be quasi co-located with PDSCH data and DMRS received in the current subframe. Accordingly, the PQI index received by selection block 508 may correspond to the PQI index of one of NZP-CSI-RS-based phase offset estimates $\hat{\theta}_{CSIRS\_i}$; i=1, 2, 3] obtained by NZP-CSI-RS offset estimation block 504. The PQI index may therefore additionally correspond to an NZP-CSI-RS-based phase offset estimate $\hat{\theta}_{CSIRS\_i}$ stored in estimation buffer block 506.

Selection block 508 may then select the NZP-CSI-RS-based phase offset estimate $\hat{\theta}_{CSIRS\_i}$ corresponding to the PQI index specified for the current subframe. As this NZP-CSI-RS-based phase offset estimate $\hat{\theta}_{CSIRS\_i}$ may be assumed quasi co-located with a received DMRS, block system 500 may utilize this NZP-CSI-RS-based phase offset estimate $\hat{\theta}_{CSIRS\_i}$ in conjunction with a DMRS-based phase offset estimate to obtain a DMRS-aided NZP-CSI-RS-based phase offset estimate $\hat{\theta}$ for the current subframe. The DMRS-aided NZP-CSI-RS based phase offset estimate $\hat{\theta}$ may offer an expanded phase offset estimation range than normal NZP-CSI-RS-based phase offset estimation, and accordingly may allow block system 500 to produce a more accurate phase offset estimate for use in timing compensation for the PDSCH data traffic in the current subframe.

Selection block 508 may thus select an NZP-CSI-RS-based phase offset estimate $\hat{\theta}_{CSIRS}$ based on the received PQI index, and may provide the resulting NZP-CSI-RS-based phase offset estimate $\hat{\theta}_{CSIRS}$ to adder 520, sign block 522, and selection block 528.

DMRS demodulation block 510 may concurrently perform DMRS demodulation on a DMRS configuration received in the current subframe, and may provide the demodulated DMRS to DMRS-based phase offset estimation block 512. DMRS-based phase offset estimation block 512 may then obtain a DMRS-based phase offset estimate $\hat{\theta}_{DMRS}$, such as by performing phase rotation of DMRS samples as previously detailed. DMRS-based phase offset estimation block 512 may then provide the resulting DMRS-based phase offset estimate to estimate buffer block 514. Estimate buffer block 514 may utilize the DMRS-based phase offset estimate to update a historical DMRS-based phase offset estimate stored in estimate buffer block 514. Estimate buffer block 514 may store a DMRS-based phase offset estimate for each PQI index in a similar manner as to estimate buffer block 506. However, as only one DMRS may be received in the current subframe, estimate buffer block 514 may only update a single DMRS-based phase offset estimate per CoMP subframe. For example, estimate buffer block 514 may average the DRMS-based phase offset estimate provided by DMRS-based phase offset estimation block 512 with a historical DMRS-based phase offset estimate corresponding to the PQI index of the DRMS-based phase offset estimate provided by DMRS-based phase offset estimation block 512. DMRS-based phase offset estimation block 512 may then store the resulting DMRS-based phase offset estimate $\hat{\theta}_{DMRS}$ for use in a subsequent CoMP subframe.

Block system 500 may utilize NZP-CSI-RS-based phase offset estimate $\hat{\theta}_{CSIRS}$ and DMRS-based phase offset estimate $\hat{\theta}_{DMRS}$ in conjunction to determine DMRS-aided NZP-CSI-RS-based phase offset estimate $\hat{\theta}$. Block system 500 may utilize the sign of NZP-CSI-RS-based phase offset estimate $\hat{\theta}_{CSIRS}$ and DMRS-based phase offset estimate $\hat{\theta}_{DMRS}$ in order to determine a phase offset estimate $\hat{\theta}$, such as detailed above in Equations 6a-6d.

The output of NZP-CSI-RS-based phase offset estimation may be bound by the wrapped range $[-\pi, +\pi]$ (corresponding to $[-2.78\ \mu s, +2.78\ \mu s]$ in the time domain), and accordingly outputs falling outside of the wrapped range $[-\pi, +\pi]$ will be wrapped back within the range by a shift of a multiple of $\pi$. Accordingly, outputs of NZP-CSI-RS-based phase offset estimation falling within the ranges $[-2\pi, -\pi]$ and $[\pi, 2\pi]$ will be offset from the correct phase offset estimate by $\pm\pi$.

Accordingly, NZP-CSI-RS-based phase offset estimate $\hat{\theta}_{CSIRS}$ may be offset by $\pm$pi. Block system 500 may thus identify whether the signs of NZP-CSI-RS-based phase offset estimate $\hat{\theta}_{CSIRS}$ and DMRS-based phase offset estimate $\hat{\theta}_{DMRS}$ are equal or opposite. If the sign of NZP-CSI-RS-based phase offset estimate $\hat{\theta}_{CSIRS}$ and the sign of DMRS-based phase offset estimate $\hat{\theta}_{DMRS}$ are the same, block system 500 may determine that NZP-CSI-RS-based phase offset estimate $\hat{\theta}_{CSIRS}$ is correct, and has not been offset due to the wrapped phase offset estimation range. Alternatively, if the sign of NZP-CSI-RS-based phase offset estimate $\hat{\theta}_{CSIRS}$ and the sign of DMRS-based phase offset estimate $\hat{\theta}_{DMRS}$ are different, block system 500 may determine that NZP-CSI-RS-based phase offset estimate $\hat{\theta}_{CSIRS}$ has been offset by $\pm\pi$, and may add either $+\pi$ or $-\pi$ to the additive inverse of NZP-CSI-RS-based phase offset estimate $\hat{\theta}_{CSIRS}$ based on the sign of DMRS-based phase offset estimate $\hat{\theta}_{DMRS}$ in order to correct the offset. Such is described in Equations 6a-6d.

Accordingly, sign block 516 may determine the sign of DMRS-based phase offset estimate $\hat{\theta}_{DMRS}$. Similarly, sign block 522 may determine the sign of NZP-CSI-RS-based phase offset estimate $\hat{\theta}_{CSIRS}$. Sign comparison block 524 may compare the sign of DMRS-based phase offset estimate $\hat{\theta}_{DMRS}$ to the sign of NZP-CSI-RS-based phase offset estimate $\hat{\theta}_{CSIRS}$.

If the sign of DMRS-based phase offset estimate $\hat{\theta}_{DMRS}$ is the same as the sign of NZP-CSI-RS-based phase offset estimate $\hat{\theta}_{CSIRS}$, sign comparison block 524 may provide phase offset estimate selection block 528 with a positive control signal. As the sign of DMRS-based phase offset estimate $\hat{\theta}_{DMRS}$ is the same as the sign of NZP-CSI-RS-based phase offset estimate $\hat{\theta}_{CSIRS}$, block system 500 may determine that NZP-CSI-RS-based phase offset estimate $\hat{\theta}_{CSIRS}$ is correct. Phase offset estimate selection block 528 may then provide NZP-CSI-RS-based phase offset estimate $\hat{\theta}_{CSIRS}$ located as the positive input pin as phase offset estimate $\hat{\theta}$, which may be subsequently used for timing compensation in reception of PDSCH data in the current subframe. Phase offset estimate $\hat{\theta}$ may be translated into the time domain in order to arrive at a timing offset estimate.

Alternatively, if the sign of DMRS-based phase offset estimate $\hat{\theta}_{DMRS}$ is not the same as the sign of NZP-CSI-RS-based phase offset estimate $\hat{\theta}_{CSIRS}$, sign comparison block 524 may provide a negative output signal. DMRS region determination block 526 may then determine if DMRS-based phase offset estimate $\hat{\theta}_{DMRS}$ is within the inherent phase offset estimation region $[-\alpha\pi, +\alpha\pi]$, where $\alpha$=0.5. If DMRS-based phase offset estimate $\hat{\theta}_{DMRS}$ is within the inherent phase offset estimation region, DMRS region determination block 526 may provide phase offset estimate selection block 528 with a positive control signal. Phase offset estimate selection block 528 may then select NZP-CSI-RS-based phase offset estimate $\hat{\theta}_{CSIRS}$ as DMRS-aided NZP-CSI-RS-based phase offset estimate $\hat{\theta}$.

If DMRS-based phase offset estimate $\hat{\theta}_{DMRS}$ is falls outside the inherent phase offset estimation region, DMRS region determination block 526 may provide phase offset estimate selection block 528 with a negative control signal. Phase offset estimate selection block 528 may then select the phase offset estimate at the negative input pin as DMRS-aided NZP-CSI-RS-based phase offset estimate $\hat{\theta}$.

The phase offset estimate at the negative input pin may be dependent on the sign of DMRS-based phase offset estimate $\hat{\theta}_{DMRS}$. As shown in FIG. 5, sign block 516 may determine the sign of DMRS-based phase offset estimate $\theta_{DMRS}$ and provide the resulting sign to multiplication block 518. Multiplication block 518 may multiply the resulting sign with $\pi$. As previously detailed, NZP-CSI-RS-based phase offset estimate $\hat{\theta}_{CSIRS}$ may be offset by $\pm\pi$ if the NZP-CSI-RS-based phase offset estimate falls outside of the range $[-\pi, +\pi]$. The sign of DMRS-based phase offset estimate $\hat{\theta}_{DMRS}$ may be utilized to determine the proper offset, either $-\pi$ or $+\pi$, to be applied to NZP-CSI-RS-based phase offset estimate $\hat{\theta}_{CSIRS}$ in order to arrive at the correct timing offset estimate value.

Accordingly, addition block 520 may output either $-\pi - \hat{\theta}_{CSIRS}$ or $\pi - \hat{\theta}_{CSIRS}$ dependent on the sign of DMRS-based phase offset estimate $\hat{\theta}_{DMRS}$, i.e. as denoted in Equations 6a-6d. Phase offset estimate selection block 528 may receive the resulting output from addition block 520 at the negative input pin, and may select the resulting output as DMRS-aided NZP-CSI-RS-based phase offset estimate $\hat{\theta}$ if a negative control input is provided by DMRS region determination block 526.

As opposed to being bound within the wrapped phase offset estimation region of $[-\pi, +\pi]$ of NZP-CSI-RS-based phase offset estimation, block system 500 may be able to provide phase offset estimate $\hat{\theta}$ that is accurate within the range $[-2\pi, +2\pi]$ (i.e. corresponding to $[-5.56 \mu s, +5.56 \mu s]$ in the time domain) through the use of DMRS-based phase offset estimation. Accordingly, the DMRS-aided NZP-CSI-RS-based phase offset estimation implemented by block system 500 may offer an expanded range without sacrificing accuracy to determine an accurate value for phase offset estimate $\hat{\theta}$.

It is appreciated that while the calculations of block system 500 have been described as being performed in the phase domain, it may be similarly practical to perform one or more of the calculations in the time domain. It is further appreciated that phase offset estimate $\hat{\theta}$ may be translated into the time domain in order to perform timing offset compensation for reception of PDSCH data traffic for the current CoMP subframe.

Method 300 and block system 500 thus detail an exemplary approach in which timing and/or phase offset estimates falling outside of the NZP-CSI-RS-based timing/phase offset estimation range may be corrected for using DMRS-based timing/phase offset estimates. Accordingly, the approach detailed in method 300 and block system 500 may improve PDSCH demodulation performance due to increased accuracy in timing and/or phase offset estimation.

Figure 6:
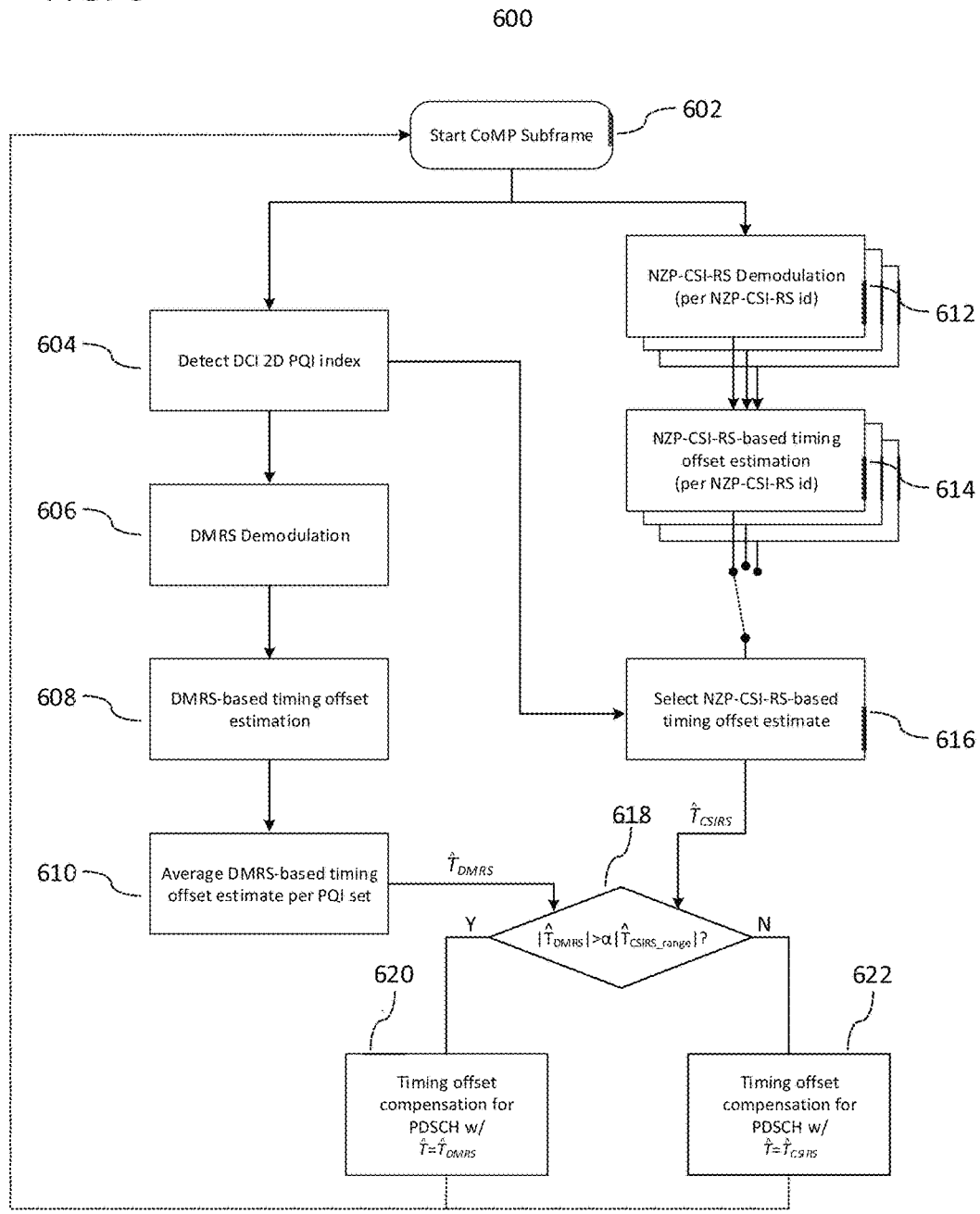
FIG. 6 shows a flow diagram illustrating a timing offset estimation process; according to a further exemplary aspect of the disclosure.

FIG. 6 shows method 600. Method 600 may be an alternative approach to combining a DMRS-based timing offset estimate $\hat{T}_{DMRS}$ and NZP-CSI-RS-based timing offset estimate $\hat{T}_{CSIRS}$ as detailed regarding method 300 in FIG. 3.

602-616 may function in a substantially similar manner as to 302-316 in method 300 in order to provide a DMRS-based timing offset estimate $\hat{T}_{DMRS}$ and NZP-CSI-RS-based timing offset estimate $T_{CSIRS}$, where the NZP-CSI-RS-based timing offset estimate $\hat{T}_{CSIRS}$ corresponds to the PQI index specified in DCI Format 2D PDCCH data for the current subframe identifying an NZP-CSI-RS configuration that may be assumed quasi co-located with a received DMRS configuration.

Method 600 may provide DMRS-aided NZP-CSI-RS-based timing offset estimate $\hat{T}$. As opposed to 318 in method 300, which as previously detailed may combine DMRS-based timing offset estimate $\hat{T}_{DMRS}$ and NZP-CSI-RS-based timing offset estimate $\hat{T}_{CSIRS}$ by shifting the additive inverse of NZP-CSI-RS-based timing offset estimate $\hat{T}_{CSIRS}$ by $\pm\pi$ according to the relative signs of DMRS-based timing offset estimate $\hat{T}_{DMRS}$ and NZP-CSI-RS-based timing offset estimate $\hat{T}_{CSIRS}$, 618 may instead select one of DMRS-based timing offset estimate $\hat{T}_{DMRS}$ or NZP-CSI-RS-based timing offset estimate $\hat{T}_{CSIRS}$ to use as timing DMRS-aided NZP-CSI-RS-based timing offset estimate $\hat{T}$.

Accordingly, 618 may evaluate the following expression to select either DMRS-based timing offset estimate $\hat{T}_{DMRS}$ or NZP-CSI-RS-based timing offset estimate $\hat{T}_{CSIRS}$ as DMRS-aided NZP-CSI-RS-based timing offset estimate:

$$|\hat{T}_{DMRS}| > \alpha |\hat{T}_{CSIRS\_range}| \quad (7),$$

where $\alpha$ is a scaling parameter and $\hat{T}_{CSIRS\_range}$ is the range in time of NZP-CSI-RS-based timing offset estimation. As previously detailed, the range in time of NZP-CSI-RS-based timing offset estimation may be bound as $[-2.78 \mu s, +2.78 \mu s]$ Equation 7 may thus be alternatively written as follows:

$$|\hat{T}_{DMRS}| > \alpha \times 2.78 \mu s \quad (8).$$

The scaling parameter $\alpha$ may be selected such that $0 < \alpha \le 1$, and may be adjusted accordingly in order to obtain intended results. The equivalent expressions of Equation 7 and 8 may thus determine whether DMRS-based timing offset estimate $\hat{T}_{DMRS}$ falls within a scaled range based on the range of NZP-CSI-RS-based timing offset estimation.

If 618 determines that DMRS-based timing offset estimate $\hat{T}_{DMRS}$ falls outside of the range $\alpha|\hat{T}_{CSIRS\_range}|$, 600 may proceed to 620 to perform timing offset compensation for PDSCH reception using timing offset estimate $\hat{T} = \hat{T}_{DMRS}$. Alternatively, if 618 determines that DMRS-based timing offset estimate $\hat{T}_{DMRS}$ falls inside of the range $\alpha|\hat{T}_{CSIRS\_range}|$, 600 may proceed to 622 to perform timing offset compensation for PDSCH reception using timing offset estimate $\hat{T} = \hat{T}_{CSIRS}$.

Method 600 may thus also utilize the expanded range of DMRS-aided NZP-CSI-RS-based timing offset estimation. Despite having lower accuracy than NZP-CSI-RS-based timing offset estimation, DMRS-based timing offset estimation may prove more reliable in scenarios in which an actual timing offset falls outside of the range of NZP-CSI-RS-based timing offset estimation.

It is appreciated that method 600 may be implemented in either the time or phase domain. Furthermore, it is appreciated that method 600 may be implemented as an iterative process which is repeated based on the PQI indices specified over a sequence of more than one subframe.

As previously detailed regarding Equation 2, a mobile terminal may obtain a phase offset estimate or timing offset estimate relative to a transmission point by evaluating the mean angle between two reference signal samples adjacent on the frequency axis, i.e. separated by a number of REs on a resource grid. 3GPP has specified a frequency distribution of 12 REs for NZP-CSI-RS (i.e. $N_{REgap\_CSIRS} = 12$) and 5 REs for DMRS (i.e. $N_{REgap\_DMRS} = 5$).

Autocorrelation bins may be utilized to determine a timing offset estimate (or equivalent phase offset estimate). An autocorrelation bin $\hat{r}_n$ with lag n may be calculated based on a reference signal as follows:

$$\hat{r}_n = \frac{1}{|\mathcal{K}|} \sum_k h(k) h^*(k+n), \quad (9)$$

where $\mathcal{K}$ is the set of index pairs (k, k+n) corresponding to the RE allocation for demodulated reference signal h on the resource grid.

Autocorrelation bin $\hat{r}_n$ may thus be calculated based on samples of reference signal h (which may be e.g. either an NZP-CSI-RS or DMRS in the implementation of method 700) separated by lag n in the frequency domain. The corresponding timing offset estimate $\hat{T}_n$ may then be obtained by evaluating the argument (i.e. phase) of autocorrelation bin $\hat{r}_n$ as follows:

$$\hat{T}_n = \frac{\arg(\hat{r}_n)}{j2\pi f_n}, \qquad (10)$$

where $\hat{f}_n$ is the distance in frequency corresponding to lag n, i.e. as defined by the associated $N_{REgap}$ and subcarrier spacing.

The quality of resulting timing offset estimate $\hat{T}_n$ may be quantitatively analyzed by evaluating the product of the cardinality $|\mathcal{K}|$ and the magnitude $|\hat{r}_n|$. The resulting expression $|\mathcal{K}|\cdot|\hat{r}_n|$ may thus be utilized as e.g. a confidence or reliability metric, as the accuracy of resulting timing offset estimate $\hat{t}_n$ may be proportional to $|\mathcal{K}|\cdot|\hat{r}_n|$.

A mobile terminal such as UE 102 may therefore utilize autocorrelation bins in order to determine a timing offset estimate $\hat{T}$ to be used in timing offset compensation during PDSCH demodulation, such as during the reception of PDSCH data as part of a CoMP scenario. UE 102 may additionally utilize the reliability evaluation associated with autocorrelation bin-based timing offset estimation, such as by evaluating the expression $|\mathcal{K}|\cdot|\hat{r}_n|$ of an obtained autocorrelation bin $\hat{r}_n$ to determine whether an associated timing offset estimate $\hat{t}_n$ is reliable.

UE 102 may thus calculate an autocorrelation bin $\hat{r}_n$ with lag n based on a reference signal received during a CoMP subframe, e.g. an NZP-CSI-RS configuration. UE 102 may then calculate an associated reliability metric of the form $|\mathcal{K}|\cdot|\hat{r}_n|$ and compare the reliability metric to a predefined threshold. If the reliability metric satisfies the threshold, UE 102 may calculate the related timing offset estimate $\hat{T}_n$ based on autocorrelation bin $\hat{r}_n$ and apply timing offset estimate $\hat{T}_n$, e.g. as timing offset estimate $\hat{T}$ in 320 of method 300.

Alternatively, if the reliability metric does not satisfy the threshold, UE 102 may not generate a timing offset estimate $\hat{T}_n$ based on the NZP-CSI-RS received in the current subframe. Instead, UE 102 may utilize a timing offset estimate $T_n'$ calculated in a previous CoMP subframe for timing offset compensation current CoMP subframe, and accumulate autocorrelation bin $\hat{r}_n$ over subsequent CoMP subframes in order to generate an updated timing offset estimate $\hat{T}_n$ in a later subframe once the reliability metric satisfies the threshold.

Furthermore, UE 102 may be configured to calculate autocorrelations bins $\hat{r}_m$ and $\hat{r}_n$ based on DMRS and NZP-CSI-RS for a current CoMP subframe, respectively, where lag m≠n due to the frequency distances $N_{REgap\_CSIRS}=12$ and $N_{REgap\_DMRS}=5$ according to the frequency distances between adjacent reference signals on the resource grid. UE 102 may then be configured to combine autocorrelation bins $\hat{r}_m$ and $\hat{r}_n$ by translating both $\hat{r}_m$ and $\hat{r}_n$ into the same lag domain, i.e. the lag n domain of NZP-CSI-RS, thereby producing a combined lag m autocorrelation bin $\hat{r}_n^{comb}$. UE 102 may then determine a resulting timing offset estimate based on the combined autocorrelation bins, thereby obtaining a timing offset estimate based on NZP-CSI-RS and DMRS.

A particular advantage of such an approach may be the aforementioned reliability evaluation associated with timing offset estimation based on autocorrelation bins. UE 102 may thus evaluate one or more reliability metrics associated with $\hat{r}_m$, $\hat{r}_n$, and/or $\hat{r}_n^{comb}$ for the current CoMP subframe to evaluate the accuracy of an associated combined timing offset estimate $\hat{T}_n^{comb}$. UE 102 may thus have a mechanism available to determine if the timing offset estimates calculated based on reference signals in the current CoMP are accurate. UE 102 may then decide to utilize the timing offset estimates if the associated reliability metrics are satisfactory, or to utilize timing offset estimates calculated based on reference signals from previous CoMP frames while continuing to accumulate autocorrelation bins in subsequent subframes for potential later use.

Figure 7:
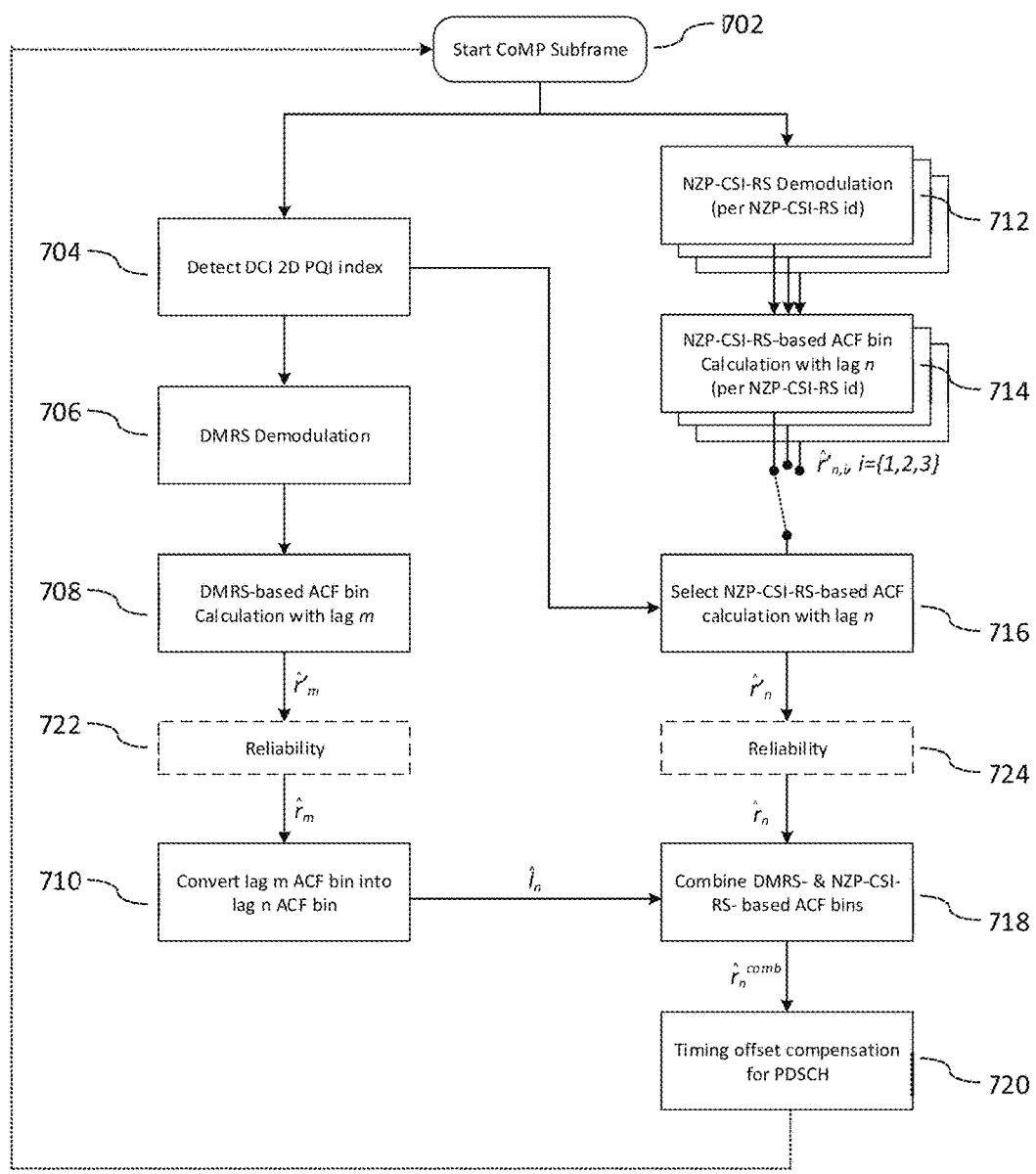
FIG. 7 shows a flow diagram illustrating a timing offset estimation process according to a further exemplary aspect of the disclosure.

FIG. 7 shows a flow chart illustrating method 700. Method 700 may be utilized for similar applications as methods 300 and 600, such as to produce a timing offset estimate or phase offset estimate for multiple TPs in a CoMP scheme.

Similarly to as previously detailed, method 700 may utilize autocorrelation bins associated with both NZP-CSI-RS-based timing offset estimation and DMRS-based timing offset estimation in order to generate a combined timing offset estimate $\hat{T}_n^{comb}$ for the specified PQI index of a given CoMP subframe.

Method 700 may utilize reliability metrics associated with the related autocorrelation bins in order to determine if a resulting timing offset estimation is suitable for use.

Method 700 may execute 702-706 and 712 in a manner substantially similar to 302-306 and 312 respectively in method 300 and 602-606 and 612 respectively in method 600. Method 700 may thus determine the specified PQI index for the current subframe by receiving DCI Format 2D PDCCH data from the serving cell in 704, and perform DMRS demodulation on a received DMRS configuration in 706 to obtain a demodulated DMRS configuration.

Method 700 may perform NZP-CSI-RS demodulation for each NZP-CSI-RS configuration according to each PQI index in 712, and may thus obtain a demodulated NZP-CSI-RS configuration for each PQI index.

Method 700 may then determine a DMRS-based autocorrelation (ACF) bin $\hat{r}_m'$ with lag m in 708, such as by evaluating the mean angle between two DMRS samples separated by $N_{REgap\_DMRS}=5$ REs along the frequency axis of the resource grid as detailed regarding Equation 9.

Similarly, method 700 may determine an NZP-CSI-RS-based autocorrelation (ACF) bin $\hat{r}_{n,i}'$, i={1, 2, 3} for each of the 3 possible PQI indices of DPS CoMP network 100 with lag n in 708, such as by evaluating the mean angle between two NZP-CSI-RS samples separated by $N_{REgap\_CSIRS}=12$ REs along the frequency axis of the resource grid as detailed regarding Equation 9.

Method 700 may then select the NZP-CSI-RS-based autocorrelation bin based on the specified PQI index for the current subframe in 704 as the NZP-CSI-RS-based autocorrelation bin $\hat{r}_n'$ with lag n. As previously detailed, this selection in 716 is based on the quasi co-location assumption between CSI-RS antenna ports and DMRS antenna ports specified by the PQI index for a given CoMP subframe.

Method 700 may thus obtain autocorrelation bins $\hat{r}_m'$ and $\hat{r}_n'$ with lags m and n, respectively, in 708 and 716. Method 700 may then perform a reliability check on autocorrelation bins $\hat{r}_m'$ and $\hat{r}_n'$ in 722 and 724 in order to determine whether timing offset estimates generated from autocorrelation bins $\hat{r}_m'$ and $\hat{r}_n'$ would be accurate.

Method 700 may thus determine a reliability metric for each autocorrelation bin $\hat{r}_m'$ and $\hat{r}_n'$, where the reliability metrics are calculated as $|\mathcal{K}_m| \cdot |\hat{r}_m'|$ and $|\mathcal{K}_n| \cdot |\hat{r}_n'|$ using the respective cardinality of $\mathcal{K}_m$ and $\mathcal{K}_n$ utilized in Equation 9 to calculate autocorrelation bins $\hat{r}_m'$ and $\hat{r}_n'$, respectively.

722 and 724 may thus evaluate the reliability metrics $|\mathcal{K}_m| \cdot |\hat{r}_m'|$ and $|\mathcal{K}_n| \cdot |\hat{r}_n'|$ associated with each autocorrelation bin $\hat{r}_m'$ and $\hat{r}_n'$, such as by comparing the each reliability metric $|\mathcal{K}_m| \cdot |\hat{r}_m'|$ and $|\mathcal{K}_n| \cdot |\hat{r}_n'|$ to a respective reliability threshold.

For example, 722 may evaluate the expression $|\mathcal{K}_m| \cdot |\hat{r}_m'| > th_m$, where $th_m$ is a predefined reliability threshold for DMRS autocorrelation bins. If $|\mathcal{K}_m| \cdot |\hat{r}_m'| > th_m$, 722 may select autocorrelation bin $\hat{r}_m'$ obtained in 708 as DMRS autocorrelation bin $\hat{r}_m$, which may be subsequently applied in method 700 as will be later detailed.

If $|\mathcal{K}_m| \cdot |\hat{r}_m'| \leq th_m$, 722 may determine that $\hat{r}_m'$ does not satisfy reliability requirements for generating timing offset estimates from autocorrelation bins, and thus may conclude that autocorrelation bin $\hat{r}_m'$ determined based on the DMRS configuration received in the current CoMP subframe is unsuitable for use in generating a timing offset estimate. Accordingly, 722 may not select $\hat{r}_m'$ as DMRS autocorrelation bin $\hat{r}_m$.

Instead, 722 may utilize a previously obtained DMRS autocorrelation bin, such as a DMRS autocorrelation bin $\hat{r}_m''$ obtained in a previous CoMP subframe that satisfied the reliability metric evaluation expression $|\mathcal{K}_m| \cdot |\hat{r}_m''| > th_m$. 722 may thus select $\hat{r}_m''$ as DMRS autocorrelation bin $\hat{r}_m$ to be used in subsequent operations of method 700. Method 700 may continue to accumulate autocorrelation bins $\hat{r}_m'$ over subsequent CoMP subframes to determine if an autocorrelation bin $\hat{r}_m'$ satisfies the requisite reliability thresholds for timing offset estimate generation.

224 may similarly evaluate the expression $|\mathcal{K}_n| \cdot |\hat{r}_n'| > th_n$, where $th_n$ is a predefined reliability threshold for NZP-CSI-RS autocorrelation bins. If $|\mathcal{K}_n| \cdot |\hat{r}_n'| > th_n$, 724 may select autocorrelation bin $\hat{r}_n'$ ad NZP-CSI-RS autocorrelation bin $\hat{r}_m$, which may be subsequently applied in method 700 as will be later detailed.

If $|\mathcal{K}_n| \cdot |\hat{r}_n'| \leq th_n$, 724 may determine that $\hat{r}_n'$ does not satisfy reliability requirements for generating timing offset estimates from autocorrelation bins, and thus may conclude that autocorrelation bin $\hat{r}_n'$ determined based on the NZP-CSI-RS configuration associated with the specified PQI index of the current CoMP subframe is unsuitable for use in generating a timing offset estimate. Accordingly, 724 may not select $\hat{r}_n'$ as NZP-CSI-RS autocorrelation bin $\hat{r}_n$.

Similarly as to 722, 724 may utilize a previously obtained NZP-CSI-RS autocorrelation bin, such as an NZP-CSI-RS autocorrelation bin $\hat{r}_n''$ obtained in a previous CoMP subframe that satisfied the reliability metric evaluation expression $|\mathcal{K}_n| \cdot |\hat{r}_n''| > th_n$. 722 may thus select $\hat{r}_n''$ as NZP-CSI-RS autocorrelation bin $\hat{r}_n$ to be used in subsequent operations of method 700. Method 700 may continue to accumulate autocorrelation bins $\hat{r}_n'$ over subsequent CoMP subframes to determine if an autocorrelation bin $\hat{r}_n'$ satisfies the requisite reliability thresholds for timing offset estimate generation.

Method 700 may thus obtain DMRS autocorrelation bin $\hat{r}_m$ and NZP-CSI-RS autocorrelation bin $\hat{r}_n$ following 724, with respective lags m and n in accordance with the distribution of DMRS and NZP-CSI-RS along the frequency axis in the resource grid.

Method 700 may then convert lag n DMRS autocorrelation bin $\hat{r}_m$ into lag n DMRS autocorrelation bin $\hat{l}_n$ in 710 as follows:

$$\hat{l}_n = |\hat{r}_m| \left( \frac{\hat{r}_m}{|\hat{r}_m|} \right)^{\pm m/n}, \quad (11)$$

where the ambiguity with in the sign of the exponent ($\pm m/n$) is distinguished by the cases where m>n and n>m. If m>n, the covered range of timing offsets that can be derived from a lag m autocorrelation bin is bound by $$\left[ -\frac{1}{\pi f_m}, \frac{1}{\pi f_m} \right].$$

Accordingly, the destination resolution is smaller than the source resolution and the sign of the exponent is always positive. If n>m, the destination resolution is smaller than the source resolution, which implies the sign of the exponent may be selected as $\text{sign}(\Im\{\hat{r}_m\} \cdot \Im\{\hat{r}_n\})$ in order to resolve the ambiguity of the phase of autocorrelation bin $\hat{r}_n$ with respect to the destination range.

710 may thus convert lag m DMRS autocorrelation bin $\hat{r}_m$ in to the lag n domain to generate a corresponding lag n DMRS autocorrelation bin $\hat{l}_n$.

718 may then combine lag n DMRS autocorrelation bin $\hat{l}_n$ and lag n NZP-CSI-RS autocorrelation bin $\hat{r}_n$ in 718 to generate a combined lag n autocorrelation bin $\hat{r}_n^{comb}$. 718 may calculate combined lag n autocorrelation bin $\hat{r}_n^{comb}$ from lag n DMRS autocorrelation bin $\hat{l}_n$ and lag n NZP-CSI-RS autocorrelation bin $\hat{r}_n$ as follows:

$$\hat{r}_n^{comb} = \alpha \hat{l}_n + \beta \hat{r}_n \quad (12),$$

where $\alpha$ and $\beta$ are weighting coefficients that may be applied by 718 in order to weight the contribution of lag n DMRS autocorrelation bin $\hat{l}_n$ or combined lag n autocorrelation bin $\hat{r}_n^{comb}$ more heavily in combined lag n autocorrelation bin $\hat{r}_n^{comb}$.

Weighting coefficients $\alpha$ and $\beta$ may be set as $\alpha = \beta$, e.g. as $\alpha = \beta = 1$, in order to perform simple un-weighted combination of lag n DMRS autocorrelation bin $\hat{l}_n$ and lag n NZP-CSI-RS autocorrelation bin $\hat{r}_n$. Alternatively, weighting coefficients $\alpha$ and $\beta$ may be selected as constant values to consistently weight generation of combined lag n autocorrelation bin $\hat{r}_n^{comb}$ towards either lag n DMRS autocorrelation bin $\hat{l}_n$ or lag n NZP-CSI-RS autocorrelation bin $\hat{r}_n$.

In a further implementation, weighting coefficients $\alpha$ and $\beta$ may be adaptable. For example, one of the received DMRS configuration or NZP-CSI-RS configuration may be subject to increased interference and/or noise due to e.g. a specific RE allocation. Accordingly, 718 may evaluate the noise variance of the received DMRS configuration and NZP-CSI-RS configuration, e.g. as a signal-to-noise ratio (SNR) in order to determine appropriate values for weighting coefficients $\alpha$ and $\beta$.

Combined lag n autocorrelation bin $\hat{r}_n^{comb}$ may thus be based on both DMRS and NZP-CSI-RS by virtue of lag n DMRS autocorrelation bin $\hat{l}_n$ and lag n NZP-CSI-RS autocorrelation bin $\hat{r}_n$. 720 may then perform timing offset compensation on PDSCH using combined lag n autocorrelation bin $\hat{r}_n^{comb}$. 720 may determine a corresponding timing offset estimate $\hat{T}_n^{comb}$ from combined lag n autocorrelation bin $\hat{r}_n^{comb}$, e.g. based on Equation 10, to apply in timing offset compensation for PDSCH data during the current CoMP subframe.

Method 700 may perform reliability evaluation on combined lag n autocorrelation bin $\hat{r}_n^{comb}$ as opposed to performing reliability evaluation on both of lag m DMRS autocorrelation bin $\hat{r}_m$ and lag n NZP-CSI-RS autocorrelation bin $\hat{r}_n$ in 722 and 724. For example, method 700 may perform reliability evaluation on combined lag n autocorrelation bin $\hat{r}_n^{comb}$ between 718 and 720, such as by evaluating the associated reliability metric expression $\hat{r}_n^{comb}$ in order to determine whether a corresponding timing offset estimate $\hat{T}_n^{comb}$ will have satisfactory accuracy. If combined lag n autocorrelation bin $\hat{r}_n^{comb}$ fails the reliability evaluation, method 700 may utilize a combined lag n autocorrelation bin $\hat{r}_n^{comb'}$ calculated in a previous CoMP subframe for timing offset compensation in the current subframe, and continue to accumulate combined lag n autocorrelation bin $\hat{r}_n^{comb}$ for subsequent CoMP subframes.

Alternatively to utilizing legacy autocorrelation bins, i.e. autocorrelation bins calculated in previous CoMP subframes, in the event of reliability metric failure for the current CoMP subframe, method 700 may be configured with one or more additional fallback procedures, such as any other timing offset estimate generation procedure detailed herein.

It is appreciated that method 700 may be implemented in order to generate an equivalent phase offset estimate as opposed to timing offset estimate for a given CoMP subframe, such as e.g. to be used by phase de-rotators during PDSCH demodulation. It is additionally appreciated that method 700 may be implemented in an iterative fashion, and thus may be performed over a progression of subsequent CoMP subframes. An iterative implementation of method 700 may be practical due to the presence of the reliability check, which may require several iterations of method 700 over several CoMP subframes in order to accumulate autocorrelation bins that satisfy the associated reliability check thresholds.

Figure 8:
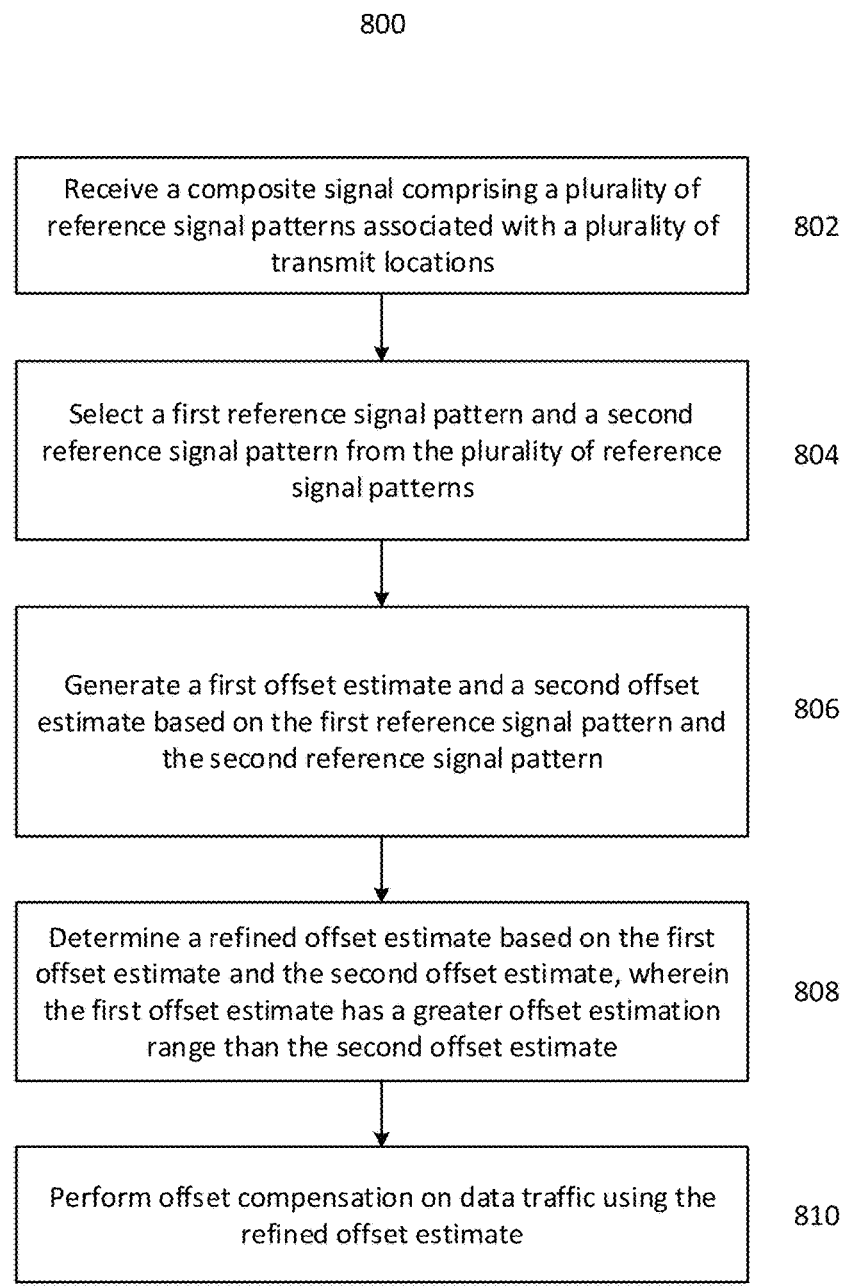
FIG. 8 shows a flow diagram illustrating a method for processing signals.

FIG. 8 shows method 800, which is a method of processing signals. In 802, method 800 may receive a composite signal comprising a plurality of reference signal patterns associated with a plurality of transmit locations. Method 800 may then identify a first reference signal pattern and a second reference signal pattern from the plurality of reference signal patterns, wherein the first reference signal pattern and the second reference signal pattern have similar signal properties in 804.

Method 800 may then generate a first offset estimate and a second offset estimate based on the first reference signal pattern and the second reference signal pattern in 806. In 808, method 800 may determine a refined offset estimate based on the first offset estimate and the second offset estimate, wherein the first offset estimate has a greater offset estimation range than the second offset estimate. Method 800 may then Perform offset compensation on data traffic using the refined offset estimate in 810.

Method 800 may thus be applied to determine DMRS-aided NZP-CSI-RS-based timing and phase offset estimates, such as by utilizing the expanded range of DMRS-based timing and phase offset estimation.

In an exemplary aspect of the disclosure, method 800 may be further associated with one of block system 500, method 300, method 600, or method 700, and accordingly may perform substantially similar functionality to any related components thereof.

Figure 9:
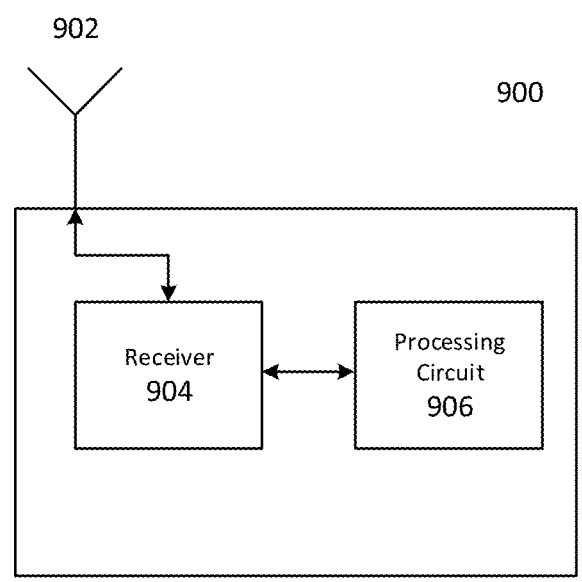
FIG. 9 shows a mobile terminal device including a mobile processing circuit.

FIG. 9 shows mobile terminal device 900. Mobile terminal device 900 may include at least a receiver circuit (receiver 904) and a processing circuit (processing circuit 906).

In a first exemplary aspect of the disclosure, the receiver circuit may be configured to receive a composite signal comprising a plurality of reference signal patterns associated with a plurality of transmit locations. The processing circuit may be configured to identify a first reference signal pattern and a second reference signal pattern from the plurality of reference signal patterns, generate a first offset estimate and a second offset estimate based on the first reference signal pattern and the second reference signal pattern, determine a refined offset estimate based on the first offset estimate and the second offset estimate, wherein the first offset estimate has a greater offset estimation range than the second offset estimate, and perform offset compensation on data traffic using the refined offset estimate.

In a further exemplary aspect of the disclosure, the receiver circuit may be configured to receive a downlink signal comprising plurality of reference signal configurations associated with a plurality of transmission locations. The processing circuit may be configured to identify a first Demodulation Reference Signal (DMRS) configuration and a first Channel State Information Reference Signal (CSI-RS) configuration from the plurality of reference signals based on control information indicating that the first DMRS configuration and the CSI-RS configuration are associated with a first transmission point of the plurality of transmission points, generate a first offset estimate for the first transmission point based on the first DMRS configuration and a second offset estimate for the first transmission point based on the first CSI-RS configuration, determine a refined offset estimate for the first transmission point based on the first offset estimate and the second offset estimate, wherein the first offset estimate has a greater offset estimation range than the second offset estimate, and perform offset compensation on data traffic received from the first transmission point using the refined offset estimate.

In further exemplary aspects of the disclosure, mobile terminal device 900 may be configured to implement functionality of one or more of block system 500, method 300, method 600, or method 700.

As shown in FIG. 9, mobile terminal device 900 may further include antenna 902, which may receive and/or transmit wireless radio frequency signals. Receiver 904 may be connected with antenna 902 such that receiver 904 may control the reception and transmission of wireless radio frequency signals.

Mobile terminal device 900 may include further internal components not explicitly pictured in FIG. 9. For example, mobile terminal device 900 may further include additional components, including hardware, processors, memory, and other specialty or generic hardware/processors/circuits, etc., in order to support a variety of additional operations of wireless radio communications. Mobile terminal device 900 may include a core central processing unit (CPU), which may be configured to act as a controller for mobile terminal device 900. The core CPU may be configured to execute applications, such as e.g. applications corresponding to program code stored in a memory component of mobile terminal 900. The core CPU may also be configured to execute operations according to a protocol stack. Mobile terminal device 900 may also include a variety of user input/output devices such as displays, keypads, touchscreens, speakers, external buttons, etc.

In a further exemplary aspect of the disclosure, processing circuit 906 may be a mobile processing circuit, such a wireless communication modem or a broadband chipset. Processing circuit 906 may be configured to identify a first reference signal pattern and a second reference signal pattern from the plurality of reference signal patterns, and wherein the plurality of reference signal patterns are associated with a plurality of transmit locations, generate a first offset estimate and a second offset estimate based on the first reference signal pattern and the second reference signal pattern, and determine a refined offset estimate based on the first offset estimate and the second offset estimate, wherein the first offset estimate has a greater offset estimation range than the second offset estimate.

Figure 10:
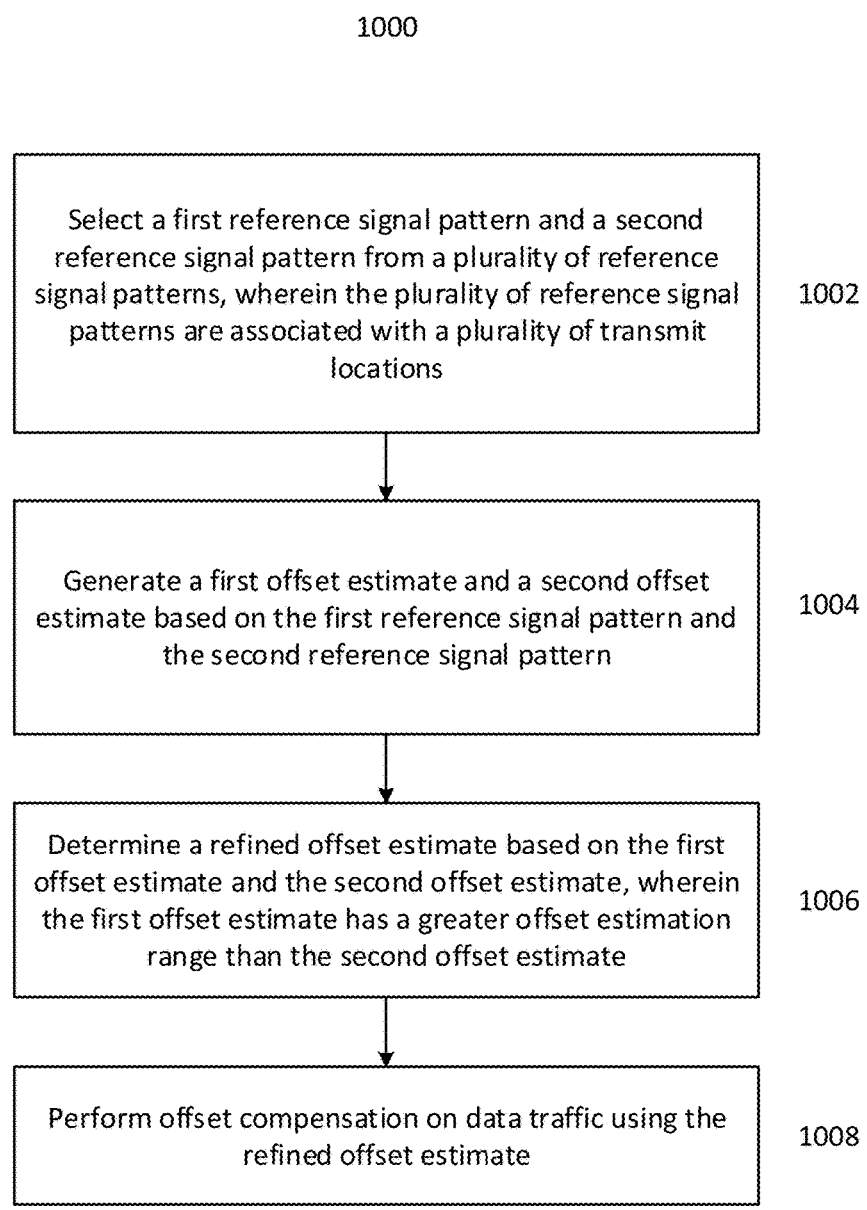
FIG. 10 shows a method of processing signals.

FIG. 10 shows method 1000, which is a method of processing signals. In 1002, method 1000 may identify a first reference signal pattern and a second reference signal pattern from a plurality of reference signal patterns, wherein the plurality of reference signal patterns are associated with a plurality of transmit locations. Method 1000 may then generate a first offset estimate and a second offset estimate based on the first reference signal pattern and the second reference signal pattern in 1004. Method 1000 may determine a refined offset estimate based on the first offset estimate and the second offset estimate, wherein the first offset estimate has a greater offset estimation range than the second offset estimate in 1006. In 1008, method 1000 may perform offset compensation on data traffic using the refined offset estimate.

In an exemplary aspect of the disclosure, method 1000 may be further associated with one of block system 500, method 300, method 600, or method 700, and accordingly may perform substantially similar functionality to any related components thereof.

The following examples pertain to further aspects of this disclosure:

Example 1 is a mobile terminal device. The mobile terminal device includes a receiver circuit configured to receive a composite signal including a plurality of reference signal patterns associated with a plurality of transmit locations, and a processing circuit configured to identify a first reference signal pattern and a second reference signal pattern from the plurality of reference signal patterns, generate a first offset estimate and a second offset estimate based on the first reference signal pattern and the second reference signal pattern, and determine a refined offset estimate based on the first offset estimate and the second offset estimate, wherein the first offset estimate has a greater offset estimation range than the offset estimation range of the second offset estimate.

In Example 2, the subject matter of Example 1 can optionally include wherein the processing circuit is configured to identify a first reference signal pattern and a second reference signal pattern from the plurality of reference signal patterns by identifying two reference signal patterns of the plurality of reference signal patterns that are associated with the same transmit location of the plurality of transmit locations, and selecting the two reference signal patterns of the plurality of reference signal patterns as the first reference signal pattern and the second reference signal pattern.

In Example 3, the subject matter of Example 1 or 2 can optionally include wherein the processing circuit is configured to determine a refined offset estimate based on the first offset estimate and the second offset estimate by generating the refined offset estimate by combining the first offset estimate and the second offset estimate.

In Example 4, the subject matter of Example 3 can optionally include wherein the refined offset estimate offers greater timing offset accuracy to an actual timing offset of one of the plurality of transmit locations than the first offset estimate and the second offset estimate.

In Example 5, the subject matter of Example 1 or 2 can optionally include wherein the processing circuit is configured to determine a refined offset estimate based on the first offset estimate and the second offset estimate by generating the refined offset estimate as a shifted version of the second offset estimate if the sign of the first offset estimate is different from the sign of the second offset estimate, and generating the refined offset estimate as the second offset estimate if the sign of the first offset estimate is the same as the sign of the second offset estimate.

In Example 6, the subject matter of Example 5 can optionally include wherein the processing circuit is configured to generate the refined offset estimate as a shifted version of the second offset estimate if the sign of the first offset estimate is different from the sign of the second offset estimate by shifting the second offset estimate by a predetermined shift amount to generate the refined offset estimate as a shifted version of the second offset estimate, wherein the predetermined shift amount is based on the offset estimation range of the first offset estimate.

In Example 7, the subject matter of Example 1 can optionally include wherein the processing circuit is configured to determine a refined offset estimate based on the first offset estimate and the second offset estimate by selecting the first offset estimate as the refined offset estimate if the first offset estimate is outside of a predefined range, and selecting the second offset estimate as the refined offset estimate if the first offset estimate is within the predefined range.

In Example 8, the subject matter of Example 7 can optionally include .wherein the predefined range is based on the offset estimation range of the first offset estimate.

In Example 9, the subject matter of Example 7 or 8 can optionally include wherein the predefined range is the offset estimation range of the first offset estimate scaled by a predefined scaling factor.

In Example 10, the subject matter of Example 9 can optionally include wherein the predefined scaling factor is a real number between 0 and 1.

In Example 11, the subject matter of Example 1 can optionally include wherein the processing circuit is configured to generate a first offset estimate and a second offset estimate based on the first reference signal pattern and the second reference signal pattern of the plurality of reference signals by generating the first offset estimate as a first autocorrelation bin associated with a first autocorrelation lag value based on the first reference signal pattern, and generating the second offset estimate as a second autocorrelation bin associated with a second autocorrelation lag value based on the second reference signal pattern.

In Example 12, the subject matter of Example 11 can optionally include wherein the processing circuit is further configured to perform a reliability evaluation on the first offset estimate or the second offset estimate.

In Example 13, the subject matter of Example 12 can optionally include wherein the processing circuit is configured to determine a refined offset estimate based on the first offset estimate and the second offset estimate by determining a refined offset estimate as a previously obtained refined offset estimate if the first offset estimate or the second offset estimate fails the reliability evaluation.

In Example 14, the subject matter of Example 12 or 13 can optionally include wherein the processing circuit is configured to perform a reliability evaluation on the first offset estimate or the second offset estimate by performing a reliability evaluation on the first autocorrelation bin or the second autocorrelation bin.

In Example 15, the subject matter of Example 11 can optionally include wherein the processing circuit is configured to determine a refined offset estimate based on the first offset estimate and the second offset estimate by selecting the first autocorrelation lag value or the second autocorrelation lag value as a combination autocorrelation lag value, combining the first offset estimate and the second offset estimate using the combination autocorrelation lag value to generate a combination autocorrelation bin associated with the combination autocorrelation lag value, and converting the combination autocorrelation lag value into the time domain or the phase domain to determine a refined offset estimate.

In Example 16, the subject matter of Example 1 can optionally include wherein the processing circuit is further configured to perform a reliability evaluation on the first offset estimate, the second offset estimate, or the refined offset estimate.

In Example 17, the subject matter of Example 16 can optionally include wherein the processing circuit is configured to generate one or more numerical reliability scalars from the reliability evaluation.

In Example 18, the subject matter of Example 17 can optionally include wherein the processing circuit is configured to determine the refined offset estimate based on the first offset estimate, the second offset estimate, and the one or more numerical reliability scalars.

In Example 19, the subject matter of any one of Examples 1 to 17 can optionally include wherein the receiver circuit is further configured to receive control information indicating signal property similarities between the plurality of reference signal patterns, and wherein the processing circuit is configured to identify a first reference signal pattern and a second reference signal pattern from the plurality of reference signal patterns by selecting a first reference signal pattern and a second reference signal pattern from the plurality of reference signal patterns based on the control information.

In Example 20, the subject matter of Example 19 can optionally include wherein the control information indicates that the first reference signal pattern and the second reference signal pattern have similar delay spread.

In Example 21, the subject matter of Example 19 or 20 can optionally include wherein the control information indicates that the first reference signal pattern and the second reference signal pattern are quasi co-located.

In Example 22, the subject matter of any one of Examples 1 to 21 can optionally include wherein the receiver is further configured to receive the data traffic from a first transmit location of the plurality of transmit locations, and wherein the first reference signal pattern and the second reference signal pattern are associated with the first transmit location of the plurality of transmit locations.

In Example 23, the subject matter of any one of Examples 1 to 22 can optionally include wherein the first reference signal pattern is distributed in the frequency domain of the composite signal according to a first frequency separation amount and the second reference signal pattern is distributed in the frequency domain of the composite signal according to a frequency separation amount, and wherein the second frequency separation amount is greater than the first frequency separation amount.

In Example 24, the subject matter of Example 23 can optionally include wherein the offset estimation range of the first offset estimate is dependent on the first frequency separation amount, and wherein the offset estimation range of the second offset estimate is dependent on the second frequency separation amount.

In Example 25, the subject matter of any one of Examples 1 to 22 can optionally include wherein the first reference signal pattern includes a plurality of reference symbols each separated in the frequency domain of the composite signal by a first frequency separation amount and the second reference signal pattern includes a plurality of reference symbols separated in the frequency domain of the composite signal by a second frequency separation amount, and wherein the second frequency separation amount is greater than the first frequency separation amount.

In Example 26, the subject matter of Example 25 can optionally include wherein the offset estimation range of the first offset estimate is dependent on the first frequency separation amount, and wherein the offset estimation range of the second offset estimate is dependent on the second frequency separation amount.

In Example 27, the subject matter of any one of Examples 1 to 24 can optionally include wherein the offset estimation range of the first offset estimate is a first wrapped offset estimation range and the offset estimation range of the second offset estimate is a second wrapped offset estimation range.

In Example 28, the subject matter of Example 1 can optionally include wherein the processing circuit is configured to generate a first offset estimate and a second offset estimate based on the first reference signal pattern and the second reference signal pattern of the plurality of reference signals by generating a first offset estimate based on the first reference signal pattern in the phase domain, and generating the second offset estimate based on the second reference signal pattern in the phase domain.

In Example 29, the subject matter of Example 1 can optionally include wherein the processing circuit is configured to generate a first offset estimate and a second offset estimate based on the first reference signal pattern and the second reference signal pattern of the plurality of reference signals by generating a first offset estimate based on the first reference signal pattern in the time domain, and generating the second offset estimate based on the second reference signal pattern in the time domain.

In Example 30, the subject matter of any one of Examples 1 to 29 can optionally include wherein the processing circuit is further configured to perform offset compensation on data traffic using the refined offset estimate.

In Example 31, the subject matter of Example 30 can optionally include wherein the processing circuit is configured to perform offset compensation on data traffic using the refined offset estimate by performing phase de-rotation of the data traffic using the refined offset estimate.

In Example 32, the subject matter of any one of Examples 1 to 31 can optionally include wherein the plurality of transmit locations are transmission points associated with a Coordinated Multipoint network.

In Example 33, the subject matter of any one of Examples 1 to 32 can optionally include wherein the first reference signal pattern is a Demodulation Reference Signal (DMRS) and the second reference signal pattern is a Channel State Information Reference Signal (CSI-RS).

In Example 34, the subject matter of any one of Examples 1 to 33 can optionally include wherein the first reference signal pattern and the second reference signal pattern are quasi co-located, and wherein the remaining reference signal patterns of the plurality of reference signal patterns are not quasi co-located.

In Example 35, the subject matter of any one of Examples 1 to 34 can optionally include wherein the refined offset estimate is a timing offset estimate or a phase offset estimate.

Example 36 is a method of processing signals. The method includes receiving a composite signal including a plurality of reference signal patterns associated with a plurality of transmit locations, selecting a first reference signal pattern and a second reference signal pattern from the plurality of reference signal patterns, generating a first offset estimate and a second offset estimate based on the first reference signal pattern and the second reference signal pattern, and determining a refined offset estimate based on the first offset estimate and the second offset estimate, wherein the first offset estimate has a greater offset estimation range than the second offset estimate.

In Example 37, the subject matter of Example 36 can optionally include wherein the selecting a first reference signal pattern and a second reference signal pattern from the plurality of reference signal patterns includes identifying two reference signal patterns of the plurality of reference signal patterns that are associated with the same transmit location of the plurality of transmit locations, and selecting the two reference signal patterns of the plurality of reference signal patterns as the first reference signal pattern and the second reference signal pattern.

In Example 38, the subject matter of Example 36 can optionally include wherein the determining a refined offset estimate based on the first offset estimate and the second offset estimate includes generating the refined offset estimate by combining the first offset estimate and the second offset estimate.

In Example 39, the subject matter of Example 36 can optionally include wherein the refined offset estimate offers greater timing offset accuracy to an actual timing offset of one of the plurality of transmit locations than the first offset estimate or the second offset estimate.

In Example 40, the subject matter of Example 36 or 37 can optionally include wherein the determining a refined offset estimate based on the first offset estimate and the second offset estimate includes generating the refined offset estimate as a shifted version of the second offset estimate if the sign of the first offset estimate is different from the sign of the second offset estimate, and generating the refined offset estimate as the second offset estimate if the sign of the first offset estimate is the same as the sign of the second offset estimate.

In Example 41, the subject matter of Example 40 can optionally include wherein the generating the refined offset estimate as a shifted version of the second offset estimate if the sign of the first offset estimate is different from the sign of the second offset estimate includes shifting the second offset estimate by a predetermined shift amount to generate the refined offset estimate as a shifted version of the second offset estimate, wherein the predetermined shift amount is based on the offset estimation range of the first offset estimate.

In Example 42, the subject matter of Example 36 can optionally include wherein the determining a refined offset estimate based on the first offset estimate and the second offset estimate includes selecting the first offset estimate as the refined offset estimate if the first offset estimate is outside of a predefined range, and selecting the second offset estimate as the refined offset estimate if the first offset estimate is within the predefined range.

In Example 43, the subject matter of Example 42 can optionally include wherein the predefined range is based on the offset estimation range of the first offset estimate.

In Example 44, the subject matter of Example 42 or 43 can optionally include wherein the predefined range is the offset estimation range of the first offset estimate scaled by a predefined scaling factor.

In Example 45, the subject matter of Example 44 can optionally include wherein the predefined scaling factor is a real number between 0 and 1.

In Example 46, the subject matter of Example 36 can optionally include wherein the generating a first offset estimate and a second offset estimate based on the first reference signal pattern and the second reference signal pattern of the plurality of reference signals includes generating the first offset estimate as a first autocorrelation bin associated with a first autocorrelation lag value based on the first reference signal pattern, and generating the second offset estimate as a second autocorrelation bin associated with a second autocorrelation lag value based on the second reference signal pattern.

In Example 47, the subject matter of Example 46 can optionally include performing a reliability evaluation on the first offset estimate or the second offset estimate.

In Example 48, the subject matter of Example 47 can optionally include wherein the determining a refined offset estimate based on the first offset estimate and the second offset estimate includes determining a refined offset estimate as a previously obtained refined offset estimate if the first offset estimate or the second offset estimate fails the reliability evaluation.

In Example 49, the subject matter of Example 47 or 48 can optionally include wherein the performing a reliability metric on the first offset estimate or the second offset estimate includes performing a reliability evaluation on the first autocorrelation bin or the second autocorrelation bin.

In Example 50, the subject matter of Example 36 can optionally include performing a reliability evaluation on the first offset estimate, the second offset estimate, or the refined offset estimate.

In Example 51, the subject matter of Example 50 can optionally include generating one or more numerical reliability scalars from the reliability evaluation.

In Example 52, the subject matter of Example 51 can optionally include wherein the determining the refined offset estimate includes determining the refined offset estimate based on the first offset estimate, the second offset estimate, and the one or more numerical reliability scalars.

In Example 53, the subject matter of any one of Examples 36 to 50 can optionally include receiving control information indicating signal property similarities between the plurality of reference signal patterns, and wherein the selecting a first reference signal pattern and a second reference signal pattern from the plurality of reference signal patterns includes selecting a first reference signal pattern of and a second reference signal pattern from the plurality of reference signal patterns based on the control information.

In Example 54, the subject matter of Example 53 can optionally include wherein the control information indicates that the first reference signal pattern and the second reference signal pattern have similar delay spread.

In Example 55, the subject matter of Example 53 or 54 can optionally include wherein the control information indicates that the first reference signal pattern and the second reference signal pattern are quasi co-located.

In Example 56, the subject matter of any one of Examples 36 to 55 can optionally include receiving the data traffic from a first transmit location of the plurality of transmit locations, and wherein the first reference signal pattern and the second reference signal pattern are associated with the first transmit location of the plurality of transmit locations.

In Example 57, the subject matter of any one of Examples 36 to 56 can optionally include wherein the first reference signal pattern is distributed in the frequency domain of the composite signal according to a first frequency separation amount and the second reference signal pattern is distributed in the frequency domain of the composite signal according a second frequency separation amount, and wherein the second frequency separation amount is greater than the first frequency separation amount.

In Example 58, the subject matter of Example 57 can optionally include wherein the offset estimation range of the first offset estimate is dependent on the first frequency separation amount, and wherein the offset estimation range of the second offset estimate is dependent on the second frequency separation amount.

In Example 59, the subject matter of any one of Examples 36 to 56 can optionally include wherein the first reference signal pattern includes a plurality of reference symbols each separated in the frequency domain of the composite signal by a first frequency separation amount and the second reference signal pattern includes a plurality of reference symbols each separated in the frequency domain of the composite signal according a second frequency separation amount, and wherein the second frequency separation amount is greater than the first frequency separation amount.

In Example 60, the subject matter of Example 59 can optionally include wherein the offset estimation range of the first offset estimate is dependent on the first frequency separation amount, and wherein the offset estimation range of the second offset estimate is dependent on the second frequency separation amount.

In Example 61, the subject matter of any one of Examples 36 to 60 can optionally include wherein the offset estimation range of the first offset estimate is a first wrapped offset estimation range and the offset estimation range of the second offset estimate is a second wrapped offset estimation range.

In Example 62, the subject matter of Example 36 can optionally include wherein the generating a first offset estimate and a second offset estimate based on the first reference signal pattern and the second reference signal pattern of the plurality of reference signals includes generating a first offset estimate based on the first reference signal pattern in the phase domain, and generating the second offset estimate based on the second reference signal pattern in the phase domain.

In Example 63, the subject matter of Example 36 can optionally include wherein the generating a first offset estimate and a second offset estimate based on the first reference signal pattern and the second reference signal pattern of the plurality of reference signals includes generating a first offset estimate based on the first reference signal pattern in the time domain, and generating the second offset estimate based on the second reference signal pattern in the time domain.

In Example 64, the subject matter of any one of Examples 36 to 63 can optionally include performing offset compensation on data traffic using the refined offset estimate.

In Example 65, the subject matter of Example 64 can optionally include wherein the performing offset compensation on data traffic using the refined offset estimate includes performing phase de-rotation of the data traffic using the refined offset estimate.

In Example 66, the subject matter of any one of Examples 36 to 65 can optionally include wherein the plurality of transmit locations are transmission points associated with a Coordinated Multipoint network.

In Example 67, the subject matter of any one of Examples 36 to 66 can optionally include wherein the first reference signal pattern is a Demodulation Reference Signal (DMRS) and the second reference signal pattern is a Channel State Information Reference Signal (CSI-RS).

In Example 68, the subject matter of any one of Examples 36 to 67 can optionally include wherein the first reference signal pattern and the second reference signal pattern are quasi co-located, and wherein the remaining reference signal patterns of the plurality of reference signal patterns are not quasi co-located.

In Example 69, the subject matter of any one of Examples 36 to 68 can optionally include wherein the refined offset estimate is a timing offset estimate or a phase offset estimate.

In Example 70, the subject matter of Example 36 can optionally include wherein the first offset estimate is a first autocorrelation bin associated with a first autocorrelation lag value and the second offset estimate is a second autocorrelation bin associated with a second autocorrelation lag value, and wherein the determining a refined offset estimate based on the first offset estimate and the second offset estimate includes selecting the first autocorrelation lag value or the second autocorrelation lag value as a combination autocorrelation lag value, combining the first offset estimate and the second offset estimate using the combination autocorrelation lag value to generate a combination autocorrelation bin associated with the combination autocorrelation lag value, and converting the combination autocorrelation lag value into the time domain or the phase domain to determine a refined offset estimate.

Example 71 is a mobile terminal device. The mobile terminal device includes a receiver circuit configured to receive a downlink signal including plurality of reference signal configurations associated with a plurality of transmission locations, and a processing circuit configured to identify a first Demodulation Reference Signal (DMRS) configuration and a first Channel State Information Reference Signal (CSI-RS) configuration from the plurality of reference signals based on control information indicating that the first DMRS configuration and the CSI-RS configuration are associated with a transmission point of the plurality of transmission points, generate a first offset estimate for the transmission point based on the first DMRS configuration and a second offset estimate for the transmission point based on the first CSI-RS configuration, and determine a refined offset estimate for the transmission point based on the first offset estimate and the second offset estimate, wherein the first offset estimate is associated with a greater offset estimation range than the second offset estimate.

In Example 72, the subject matter of Example 1 can optionally include wherein the processing circuit is configured to determine a refined offset estimate for the transmission point based on the first offset estimate and the second offset estimate by generating the refined offset estimate by combining the first offset estimate and the second offset estimate.

In Example 73, the subject matter of Example 71 can optionally include wherein the refined offset estimate offers greater timing offset accuracy to an actual timing offset of the transmission point than the first offset estimate and the second offset estimate.

In Example 74, the subject matter of Example 71 can optionally include wherein the processing circuit is configured to determine a refined offset estimate based on the first offset estimate and the second offset estimate by generating the refined offset estimate as a shifted version of the second offset estimate if the sign of the first offset estimate is different from the sign of the second offset estimate, and generating the refined offset estimate as the second offset estimate if the sign of the first offset estimate is the same as the sign of the second offset estimate.

In Example 75, the subject matter of Example 74 can optionally include wherein the processing circuit is configured to generate the refined offset estimate as a shifted version of the second offset estimate if the sign of the first offset estimate is different from the sign of the second offset estimate by shifting the second offset estimate by a predetermined shift amount to generate the refined offset estimate as a shifted version of the second offset estimate, wherein the predetermined shift amount is based on the offset estimation range of the first offset estimate.

In Example 76, the subject matter of Example 75 can optionally include wherein the predetermined shift amount is based on the offset estimation range of CSI-RS offset estimation.

In Example 77, the subject matter of Example 71 can optionally include wherein the processing circuit is configured to determine a refined offset estimate based on the first offset estimate and the second offset estimate by selecting the first offset estimate as the refined offset estimate if the first offset estimate is outside of a predefined range, and selecting the second offset estimate as the refined offset estimate if the first offset estimate is within the predefined range.

In Example 78, the subject matter of Example 77 can optionally include wherein the predefined range is based on the offset estimation range of the first offset estimate.

In Example 79, the subject matter of Example 77 or 78 can optionally include wherein the predefined range is the offset estimation range of the first offset estimate scaled by a predetermined scaling factor.

In Example 80, the subject matter of Example 79 can optionally include wherein the predefined scaling factor is a real number between 0 and 1.

In Example 81, the subject matter of Example 71 can optionally include wherein the processing circuit is configured to generate a first offset estimate and a second offset estimate based on the first DMRS configuration and the first CSI-RS configuration of the plurality of reference signals by generating the first offset estimate as a first autocorrelation bin associated with a first autocorrelation lag value based on the first DMRS configuration, and generating the second offset estimate as a second autocorrelation bin associated with a second autocorrelation lag value based on the first CSI-RS configuration.

In Example 82, the subject matter of Example 81 can optionally include wherein the processing circuit is further configured to perform a reliability evaluation on the first offset estimate or the second offset estimate.

In Example 83, the subject matter of Example 82 can optionally include wherein the processing circuit is further configured to generate one or more numerical reliability scalars from the reliability evaluation.

In Example 84, the subject matter of Example 83 can optionally include wherein the processing circuit is configured to determine the refined offset estimate based on the first offset estimate, the second offset estimate, and the one or more numerical reliability scalars.

In Example 85, the subject matter of Example 82 can optionally include wherein the processing circuit is configured to determine a refined offset estimate based on the first offset estimate and the second offset estimate by determining a refined offset estimate as a previously obtained refined offset estimate if the first offset estimate or the second offset estimate fails the reliability evaluation.

In Example 86, the subject matter of Example 82 or 85 can optionally include wherein the processing circuit is configured to perform a reliability evaluation on the first offset estimate or the second offset estimate by performing a reliability evaluation on the first autocorrelation bin or the second autocorrelation bin.

In Example 87, the subject matter of Example 81 can optionally include wherein the processing circuit is configured to determine a refined offset estimate based on the first offset estimate and the second offset estimate by selecting the first autocorrelation lag value or the second autocorrelation lag value as a combination autocorrelation lag value, combining the first offset estimate and the second offset estimate using the combination autocorrelation lag value to generate a combination autocorrelation bin associated with the combination autocorrelation lag value, and converting the combination autocorrelation lag value into the time domain or the phase domain to determine a refined offset estimate.

In Example 88, the subject matter of Example 71 can optionally include wherein the processing circuit is further configured to perform a reliability evaluation on the first offset estimate, the second offset estimate, or the refined offset estimate.

In Example 89, the subject matter of any one of Examples 71 to 88 can optionally include wherein the receiver circuit is further configured to receive the control information.

In Example 90, the subject matter of Example 89 can optionally include wherein the wherein the control information indicates that the first DMRS configuration and the first CSI-RS configuration have similar delay spread.

In Example 91, the subject matter of Example 89 or 90 can optionally include wherein the control information indicates that the first DMRS configuration and the first CSI-RS configuration are quasi co-located.

In Example 92, the subject matter of any one of Examples 71 to 91 can optionally include wherein the receiver is further configured to receive the data traffic from a first transmit location of the plurality of transmit locations, and wherein the first DMRS configuration and the first CSI-RS configuration are associated with the first transmit location of the plurality of transmit locations.

In Example 93, the subject matter of any one of Examples 71 to 92 can optionally include wherein the first DMRS configuration is distributed in the frequency domain of the downlink signal according to a first frequency separation amount and the first CSI-RS configuration is distributed in the frequency domain of the downlink signal according a second frequency separation amount, and wherein the second frequency separation amount is greater than the first frequency separation amount.

In Example 94, the subject matter of Example 93 can optionally include wherein the offset estimation range of the first offset estimate is dependent on the first frequency separation amount, and wherein the offset estimation range of the second offset estimate is dependent on the second frequency separation amount.

In Example 95, the subject matter of any one of Examples 71 to 92 can optionally include wherein the first DMRS configuration includes a plurality of DMRS symbols each separated in the frequency domain of the downlink signal according to a first frequency separation amount and the first CSI-RS configuration includes a plurality of CSI-RS symbols each separated in the frequency domain of the downlink signal according a second frequency separation amount, and wherein the second frequency separation amount is greater than the first frequency separation amount.

In Example 96, the subject matter of Example 95 can optionally include wherein the offset estimation range of the first offset estimate is dependent on the first frequency separation amount, and wherein the offset estimation range of the second offset estimate is dependent on the second frequency separation amount.

In Example 97, the subject matter of Example 71 can optionally include wherein the processing circuit is configured to generate a first offset estimate and a second offset estimate based on the first DMRS configuration and the first CSI-RS configuration of the plurality of reference signals by generating a first offset estimate based on the first DMRS configuration in the phase domain, and generating the second offset estimate based on the first CSI-RS configuration in the phase domain.

In Example 98, the subject matter of Example 71 can optionally include wherein the processing circuit is configured to generate a first offset estimate and a second offset estimate based on the first DMRS configuration and the first CSI-RS configuration of the plurality of reference signals by generating a first offset estimate based on the first DMRS configuration in the time domain, and generating the second offset estimate based on the first CSI-RS configuration in the time domain.

In Example 99, the subject matter of any one of Examples 71 to 98 can optionally include wherein the processing circuit is further configured to perform offset compensation on data traffic received from the transmission point using the refined offset estimate.

In Example 100, the subject matter of Example 99 can optionally include wherein the processing circuit is configured to perform offset compensation on data traffic using the refined offset estimate by performing phase de-rotation of the data traffic using the refined offset estimate.

In Example 101, the subject matter of any one of Examples 71 to 100 can optionally include wherein the plurality of transmit locations are transmission points associated with a Coordinated Multipoint network.

In Example 102, the subject matter of Example 71 can optionally include wherein the downlink signal includes a Long Term Evolution (LTE) downlink signal, and wherein the plurality of transmission locations include a plurality of transmission points in a Coordinated Multipoint (CoMP) network.

In Example 103, the subject matter of Example 71 can optionally include wherein the radio frequency processing circuit is further configured to receive the control information, wherein the control information indicates that the first DMRS configuration and the first CSI-RS configuration are quasi co-located.

In Example 104, the subject matter of any one of Examples 1 to 34 can optionally include wherein the refined offset estimate is a timing offset estimate or a phase offset estimate.

Example 105 is a mobile processing circuit. The mobile processing circuit is configured to identify a first reference signal pattern and a second reference signal pattern from the plurality of reference signal patterns, wherein the plurality of reference signal patterns are associated with a plurality of transmit locations, generate a first offset estimate and a second offset estimate based on the first reference signal pattern and the second reference signal pattern, and determine a refined offset estimate based on the first offset estimate and the second offset estimate, wherein the first offset estimate has a greater offset estimation range than the second offset estimate.

In Example 106, the subject matter of Example 105 can optionally include configured to identify a first reference signal pattern and a second reference signal pattern from the plurality of reference signal patterns by identifying two reference signal patterns of the plurality of reference signal patterns that are associated with the same transmit location of the plurality of transmit locations, and selecting the two reference signal patterns of the plurality of reference signal patterns as the first reference signal pattern and the second reference signal pattern.

In Example 107, the subject matter of Example 105 can optionally include configured to determine a refined offset estimate based on the first offset estimate and the second offset estimate by generating the refined offset estimate by combining the first offset estimate and the second offset estimate.

In Example 108, the subject matter of Example 107 can optionally include wherein the refined offset estimate offers greater timing offset accuracy to an actual timing offset of one of the plurality of transmit locations than the first offset estimate and the second offset estimate.

In Example 109, the subject matter of Example 105 or 106 can optionally include configured to determine a refined offset estimate based on the first offset estimate and the second offset estimate by generating the refined offset estimate as a shifted version of the second offset estimate if the sign of the first offset estimate is different from the sign of the second offset estimate, and generating the refined offset estimate as the second offset estimate if the sign of the first offset estimate is the same as the sign of the second offset estimate.

In Example 110, the subject matter of Example 109 can optionally include configured to generate the refined offset estimate as a shifted version of the second offset estimate if the sign of the first offset estimate is different from the sign of the second offset estimate by shifting the second offset estimate by a predetermined shift amount to generate the refined offset estimate as a shifted version of the second offset estimate, wherein the predetermined shift amount is based on the offset estimation range of the first offset estimate.

In Example 111, the subject matter of Example 105 can optionally include configured to determine a refined offset estimate based on the first offset estimate and the second offset estimate by selecting the first offset estimate as the refined offset estimate if the first offset estimate is outside of a predefined range, and selecting the second offset estimate as the refined offset estimate if the first offset estimate is within the predefined range.

In Example 112, the subject matter of Example 111 can optionally include wherein the predefined range is based on the offset estimation range of the first offset estimate.

In Example 113, the subject matter of Example 110 or 111 can optionally include wherein the predefined range is the offset estimation range of the first offset estimate scaled by a predefined scaling factor.

In Example 114, the subject matter of Example 113 can optionally include wherein the predefined scaling factor is a real number between 0 and 1.

In Example 115, the subject matter of Example 105 can optionally include configured to generate a first offset estimate and a second offset estimate based on the first reference signal pattern and the second reference signal pattern of the plurality of reference signals by generating the first offset estimate as a first autocorrelation bin associated with a first autocorrelation lag value based on the first reference signal pattern, and generating the second offset estimate as a second autocorrelation bin associated with a second autocorrelation lag value based on the second reference signal pattern.

In Example 116, the subject matter of Example 115 can optionally include wherein the processing circuit is further configured to perform a reliability evaluation on the first offset estimate or the second offset estimate.

In Example 117, the subject matter of Example 116 can optionally include further configured to generate one or more numerical reliability scalars from the reliability evaluation.

In Example 118, the subject matter of Example 117 can optionally include configured to determine the refined offset estimate based on the first offset estimate, the second offset estimate, and the one or more numerical reliability scalars.

In Example 119, the subject matter of Example 116 can optionally include configured to determine a refined offset estimate based on the first offset estimate and the second offset estimate by determining a refined offset estimate as a previously obtained refined offset estimate if the first offset estimate or the second offset estimate fails the reliability evaluation.

In Example 120, the subject matter of Example 116 or 119 can optionally include configured to perform a reliability evaluation on the first offset estimate or the second offset estimate by performing a reliability evaluation on the first autocorrelation bin or the second autocorrelation bin.

In Example 121, the subject matter of Example 115 can optionally include configured to determine a refined offset estimate based on the first offset estimate and the second offset estimate by selecting the first autocorrelation lag value or the second autocorrelation lag value as a combination autocorrelation lag value, combining the first offset estimate and the second offset estimate using the combination autocorrelation lag value to generate a combination autocorrelation bin associated with the combination autocorrelation lag value, and converting the combination autocorrelation lag value into the time domain or the phase domain to determine a refined offset estimate.

In Example 122, the subject matter of Example 121 can optionally include further configured to perform a reliability evaluation on the first offset estimate, the second offset estimate, or the refined offset estimate.

In Example 123, the subject matter of any one of Examples 105 to 122 can optionally include further configured to identify signal property similarities between the plurality of reference signal patterns based on control information, and wherein the mobile processing circuit is configured to identify a first reference signal pattern and a second reference signal pattern from the plurality of reference signal patterns by selecting a first reference signal pattern and a second reference signal pattern from the plurality of reference signal patterns based on the control information.

In Example 124, the subject matter of Example 123 can optionally include wherein the control information indicates that the first reference signal pattern and the second reference signal pattern have similar delay spread.

In Example 125, the subject matter of Example 123 or 124 can optionally include wherein the control information indicates that the first reference signal pattern and the second reference signal pattern are quasi co-located.

In Example 126, the subject matter of any one of Examples 105 to 125 can optionally include wherein the data traffic is associated with a first transmit location of the plurality of transmit locations, and wherein the first reference signal pattern and the second reference signal pattern are associated with the first transmit location.

In Example 127, the subject matter of any one of Examples 105 to 126 can optionally include wherein the first reference signal pattern is distributed in the frequency domain of a received signal according to a first frequency separation amount and the second reference signal pattern is distributed in the frequency domain of the received signal according to a second frequency separation amount, and wherein the second frequency separation amount is greater than the first frequency separation amount.

In Example 128, the subject matter of Example 127 can optionally include wherein the offset estimation range of the first offset estimate is dependent on the first frequency separation amount, and wherein the offset estimation range of the second offset estimate is dependent on the second frequency separation amount.

In Example 129, the subject matter of any one of Examples 105 to 126 can optionally include wherein the first reference signal pattern includes a plurality of reference symbols each separated in the frequency domain of a received signal according to a first frequency separation amount and the second reference signal pattern includes a plurality of reference symbols each separated in the frequency domain of the received signal according to a second frequency separation amount, and wherein the second frequency separation amount is greater than the first frequency separation amount.

In Example 130, the subject matter of Example 129 can optionally include wherein the offset estimation range of the first offset estimate is dependent on the first frequency separation amount, and wherein the offset estimation range of the second offset estimate is dependent on the second frequency separation amount.

In Example 131, the subject matter of any one of Examples to 130, can optionally include the offset estimation range of the first offset estimate is a first wrapped offset estimation range and the offset estimation range of the second offset estimate is a second wrapped offset estimation range.

In Example 132, the subject matter of Example 105 can optionally include configured to generate a first offset estimate and a second offset estimate based on the first reference signal pattern and the second reference signal pattern of the plurality of reference signals by generating a first offset estimate based on the first reference signal pattern in the phase domain, and generating the second offset estimate based on the second reference signal pattern in the phase domain.

In Example 133, the subject matter of Example 105 can optionally include configured to generate a first offset estimate and a second offset estimate based on the first reference signal pattern and the second reference signal pattern of the plurality of reference signals by generating a first offset estimate based on the first reference signal pattern in the time domain, and generating the second offset estimate based on the second reference signal pattern in the time domain.

In Example 134, the subject matter of any one of Examples 105 to 133 can optionally include further configured to perform offset compensation on data traffic using the refined offset estimate.

In Example 135, the subject matter of Example 134 can optionally include configured to perform offset compensation on data traffic using the refined offset estimate by performing phase de-rotation of the data traffic using the refined offset estimate.

In Example 136, the subject matter of any one of Examples 105 to 135 can optionally include wherein the plurality of transmit locations are transmission points associated with a Coordinated Multipoint network.

In Example 137, the subject matter of any one of Examples 105 to 136 can optionally include wherein the first reference signal pattern is a Demodulation Reference Signal (DMRS) and the second reference signal pattern is a Channel State Information Reference Signal (CSI-RS).

In Example 138, the subject matter of any one of Examples 105 to 137 can optionally include wherein the refined offset estimate is a timing offset estimate or a phase offset estimate.

Example 139 is a method of processing signals. The method includes selecting a first reference signal pattern and a second reference signal pattern from a plurality of reference signal patterns, wherein the plurality of reference signal patterns are associated with a plurality of transmit locations, generating a first offset estimate and a second offset estimate based on the first reference signal pattern and the second reference signal pattern, and determining a refined offset estimate based on the first offset estimate and the second offset estimate, wherein the first offset estimate has a greater offset estimation range than the second offset estimate.

In Example 140, the subject matter of Example 139 can optionally include wherein the selecting a first reference signal pattern and a second reference signal pattern from the plurality of reference signal patterns includes identifying two reference signal patterns of the plurality of reference signal patterns that are associated with the same transmit location of the plurality of transmit locations, and selecting the two reference signal patterns of the plurality of reference signal patterns as the first reference signal pattern and the second reference signal pattern.

In Example 141, the subject matter of Example 139 can optionally include wherein the determining a refined offset estimate based on the first offset estimate and the second offset estimate includes generating the refined offset estimate by combining the first offset estimate and the second offset estimate.

In Example 142, the subject matter of Example 141 can optionally include wherein the refined offset estimate offers greater timing offset accuracy to an actual timing offset of one of the plurality of transmit locations than the first offset estimate and the second offset estimate.

In Example 143, the subject matter of Example 139 or 140 can optionally include wherein the determining a refined offset estimate based on the first offset estimate and the second offset estimate includes generating the refined offset estimate as a shifted version of the second offset estimate if the sign of the first offset estimate is different from the sign of the second offset estimate, and generating the refined offset estimate as the second offset estimate if the sign of the first offset estimate is the same as the sign of the second offset estimate.

In Example 144, the subject matter of Example 143 can optionally include wherein the generating the refined offset estimate as a shifted version of the second offset estimate if the sign of the first offset estimate is different from the sign of the second offset estimate includes shifting the second offset estimate by a predetermined shift amount to generate the refined offset estimate as a shifted version of the second offset estimate, wherein the predetermined shift amount is based on the offset estimation range of the first offset estimate.

In Example 145, the subject matter of Example 139 can optionally include wherein the determining a refined offset estimate based on the first offset estimate and the second offset estimate includes selecting the first offset estimate as the refined offset estimate if the first offset estimate is outside of a predefined range, and selecting the second offset estimate as the refined offset estimate if the first offset estimate is within the predefined range.

In Example 146, the subject matter of Example 145 can optionally include wherein the predefined range is based on the offset estimation range of the first offset estimate.

In Example 147, the subject matter of Example 145 or 146 can optionally include wherein the predefined range is the offset estimation range of the first offset estimate scaled by a predefined scaling factor.

In Example 148, the subject matter of Example 147 can optionally include wherein the predefined scaling factor is a real number between 0 and 1

In Example 149, the subject matter of Example 139 can optionally include wherein the generating a first offset estimate and a second offset estimate based on the first reference signal pattern and the second reference signal pattern of the plurality of reference signals includes generating the first offset estimate as a first autocorrelation bin associated with a first autocorrelation lag value based on the first reference signal pattern, and generating the second offset estimate as a second autocorrelation bin associated with a second autocorrelation lag value based on the second reference signal pattern.

In Example 150, the subject matter of Example 149 can optionally include performing a reliability evaluation on the first offset estimate or the second offset estimate.

In Example 151, the subject matter of Example 150 can optionally include generating one or more numerical reliability scalars from the reliability evaluation.

In Example 152, the subject matter of Example 151 can optionally include wherein the determining the refined offset estimates includes determining the refined offset estimate based on the first offset estimate, the second offset estimate, and the one or more numerical reliability scalars.

In Example 153, the subject matter of Example 150 can optionally include wherein the determining a refined offset estimate based on the first offset estimate and the second offset estimate includes determining a refined offset estimate as a previously obtained refined offset estimate if the first offset estimate or the second offset estimate fails the reliability evaluation.

In Example 154, the subject matter of Example 150 or 153 can optionally include wherein the performing a reliability metric on the first offset estimate or the second offset estimate includes performing a reliability evaluation on the first autocorrelation bin or the second autocorrelation bin.

In Example 155, the subject matter of Example 139 can optionally include performing a reliability evaluation on the first offset estimate, the second offset estimate, or the refined offset estimate In Example 156, the subject matter of any one of Examples 139 to 155 can optionally include receiving control information indicating signal property similarities between the plurality of reference signal patterns, and wherein the selecting a first reference signal pattern and a second reference signal pattern from the plurality of reference signal patterns includes selecting a first reference signal pattern of and a second reference signal pattern from the plurality of reference signal patterns based on the control information.

In Example 157, the subject matter of Example 156 can optionally include wherein the control information indicates that the first reference signal pattern and the second reference signal pattern have similar delay spread.

In Example 158, the subject matter of Example 156 or 157 can optionally include wherein the control information indicates that the first reference signal pattern and the second reference signal pattern are quasi co-located.

In Example 159, the subject matter of any one of Examples 139 to 158 can optionally include receiving the data traffic from a first transmit location of the plurality of transmit locations, and wherein the first reference signal pattern and the second reference signal pattern are associated with the first transmit location of the plurality of transmit locations.

In Example 160, the subject matter of any one of Examples 139 to 159 can optionally include wherein the first reference signal pattern is distributed in the frequency domain of a received signal according to a first frequency separation amount and the second reference signal pattern is distributed in the frequency domain of the received signal according a second frequency separation amount, and wherein the second frequency separation amount is greater than the first frequency separation amount.

In Example 161, the subject matter of Example 160 can optionally include wherein the offset estimation range of the first offset estimate is dependent on the first frequency separation amount, and wherein the offset estimation range of the second offset estimate is dependent on the second frequency separation amount.

In Example 162, the subject matter of any one of Examples 139 to 159 can optionally include wherein the first reference signal pattern includes a plurality of reference symbols each separated in the frequency domain of a received signal according to a first frequency separation amount and the second reference signal pattern includes a plurality of reference symbols each separated in the frequency domain of the received signal according a second frequency separation amount, and wherein the second frequency separation amount is greater than the first frequency separation amount.

In Example 163, the subject matter of Example 162 can optionally include wherein the offset estimation range of the first offset estimate is dependent on the first frequency separation amount, and wherein the offset estimation range of the second offset estimate is dependent on the second frequency separation amount.

In Example 134, the subject matter of any one of Examples 139 to 163 can optionally include wherein the offset estimation range of the first offset estimate is a first wrapped offset estimation range and the offset estimation range of the second offset estimate is a second wrapped offset estimation range.

In Example 165, the subject matter of Example 139 can optionally include wherein the generating a first offset estimate and a second offset estimate based on the first reference signal pattern and the second reference signal pattern of the plurality of reference signals includes generating a first offset estimate based on the first reference signal pattern in the phase domain, and generating the second offset estimate based on the second reference signal pattern in the phase domain.

In Example 166, the subject matter of Example 139 can optionally include wherein the generating a first offset estimate and a second offset estimate based on the first reference signal pattern and the second reference signal pattern of the plurality of reference signals includes generating a first offset estimate based on the first reference signal pattern in the time domain, and generating the second offset estimate based on the second reference signal pattern in the time domain.

In Example 167, the subject matter of any one of Examples 139 to 166 can optionally include performing offset compensation on data traffic using the refined offset estimate.

In Example 168, the subject matter of Example 167 can optionally include wherein the performing offset compensation on data traffic using the refined offset estimate includes performing phase de-rotation of the data traffic using the refined offset estimate.

In Example 169, the subject matter of any one of Examples 139 to 168 can optionally include the plurality of transmit locations are transmission points associated with a Coordinated Multipoint network.

In Example 170, the subject matter of any one of Examples 139 to 169 can optionally include wherein the first reference signal pattern is a Demodulation Reference Signal (DMRS) and the second reference signal pattern is a Channel State Information Reference Signal (CSI-RS).

In Example 171, the subject matter of any one of Examples 139 to 170 can optionally include herein the first reference signal pattern and the second reference signal pattern are quasi co-located, and wherein the remaining reference signal patterns of the plurality of reference signal patterns are not quasi co-located.

In Example 172, the subject matter of any one of Examples 139 to 171 can optionally include wherein the refined offset estimate is a timing offset estimate or a phase offset estimate.

In Example 173, the subject matter of any one of Examples 139 to 171 can optionally include receiving a composite signal including the plurality of reference signal patterns.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile terminal device comprising:
   a receiver circuit configured to receive a composite signal comprising a plurality of reference signal patterns associated with a plurality of transmit locations; and
   a processing circuit configured to:
   identify a first reference signal pattern and a second reference signal pattern from the plurality of reference signal patterns;
   generate a first offset estimate and a second offset estimate based on the first reference signal pattern and the second reference signal pattern;

determine a refined offset estimate based on the first offset estimate and the second offset estimate, wherein the first offset estimate has a greater offset estimation range than the second offset estimate; and perform offset compensation, using the refined offset estimate, on data traffic received from one of the plurality of transmit locations.

2. The mobile terminal device of claim 1, wherein the processing circuit is configured to identify a first reference signal pattern and a second reference signal pattern from the plurality of reference signal patterns by:

identifying two reference signal patterns of the plurality of reference signal patterns that are associated with the same transmit location of the plurality of transmit locations; and selecting the two reference signal patterns of the plurality of reference signal patterns as the first reference signal pattern and the second reference signal pattern.

3. The mobile terminal device of claim 1, wherein the processing circuit is configured to determine a refined offset estimate based on the first offset estimate and the second offset estimate by:

generating the refined offset estimate as a shifted version of the second offset estimate if the sign of the first offset estimate is different from the sign of the second offset estimate; and generating the refined offset estimate as the second offset estimate if the sign of the first offset estimate is the same as the sign of the second offset estimate.

4. The mobile terminal device of claim 1, wherein the processing circuit is configured to determine a refined offset estimate based on the first offset estimate and the second offset estimate by:

selecting the first offset estimate as the refined offset estimate if the first offset estimate is outside of a predefined range; and selecting the second offset estimate as the refined offset estimate if the first offset estimate is within the predefined range.

5. The mobile terminal device of claim 1, wherein the processing circuit is configured to generate a first offset estimate and a second offset estimate based on the first reference signal pattern and the second reference signal pattern of the plurality of reference signals by:

generating the first offset estimate as a first autocorrelation bin associated with a first autocorrelation lag value based on the first reference signal pattern; and generating the second offset estimate as a second autocorrelation bin associated with a second autocorrelation lag value based on the second reference signal pattern.

6. The mobile terminal device of claim 5, wherein the processing circuit is configured to determine a refined offset estimate based on the first offset estimate and the second offset estimate by:

selecting the first autocorrelation lag value or the second autocorrelation lag value as a combination autocorrelation lag value;

combining the first offset estimate and the second offset estimate using the combination autocorrelation lag value to generate a combination autocorrelation bin associated with the combination autocorrelation lag value; and converting the combination autocorrelation lag value into the time domain or the phase domain to determine a refined offset estimate.

7. The mobile terminal device of claim 1, wherein the processing circuit is further configured to perform a reliability evaluation on the first offset estimate, the second offset estimate, or the refined offset estimate.

8. The mobile terminal device of claim 1, wherein the receiver circuit is further configured to receive control information indicating signal property similarities between the plurality of reference signal patterns, and wherein the processing circuit is configured to identify a first reference signal pattern and a second reference signal pattern from the plurality of reference signal patterns by:

selecting a first reference signal pattern and a second reference signal pattern from the plurality of reference signal patterns based on the control information.

9. The mobile terminal device of claim 8, wherein the control information indicates that the first reference signal pattern and the second reference signal pattern have similar delay spread.

10. The mobile terminal device of claim 8, wherein the control information indicates that the first reference signal pattern and the second reference signal pattern are quasi co-located.

11. The mobile terminal device of claim 1, wherein the receiver is further configured to receive the data traffic from a first transmit location of the plurality of transmit locations, and wherein the first reference signal pattern and the second reference signal pattern are associated with the first transmit location of the plurality of transmit locations.

12. The mobile terminal device of claim 1, wherein the first reference signal pattern is distributed in the frequency domain of the composite signal according to a first frequency separation amount and the second reference signal pattern is distributed in the frequency domain of the composite signal according to a frequency separation amount, and wherein the second frequency separation amount is greater than the first frequency separation amount.

13. The mobile terminal device of claim 1, wherein the first reference signal pattern comprises a plurality of reference symbols each separated in the frequency domain of the composite signal by a first frequency separation amount and the second reference signal pattern comprises a plurality of reference symbols separated in the frequency domain of the composite signal by a second frequency separation amount, and wherein the second frequency separation amount is greater than the first frequency separation amount.

14. The mobile terminal device of claim 1, wherein the processing circuit is configured to perform offset compensation on data traffic using the refined offset estimate by: performing phase de-rotation of the data traffic using the refined offset estimate.

15. The mobile terminal device of claim 1, wherein the refined offset estimate is a timing offset estimate or a phase offset estimate.

16. A method of processing signals comprising:

receiving a composite signal comprising a plurality of reference signal patterns associated with a plurality of transmit locations;

selecting a first reference signal pattern and a second reference signal pattern from the plurality of reference signal patterns;

generating a first offset estimate and a second offset estimate based on the first reference signal pattern and the second reference signal pattern;

determining a refined offset estimate based on the first offset estimate and the second offset estimate, wherein the first offset estimate has a greater offset estimation range than the second offset estimate; and performing offset compensation, using the refined offset estimate, on data traffic received from one of the plurality of transmit locations.

17. The method of claim 16, wherein the determining a refined offset estimate based on the first offset estimate and the second offset estimate comprises:
generating the refined offset estimate as a shifted version of the second offset estimate if the sign of the first offset estimate is different from the sign of the second offset estimate; and
generating the refined offset estimate as the second offset estimate if the sign of the first offset estimate is the same as the sign of the second offset estimate.

18. The method of claim 16, wherein the determining a refined offset estimate based on the first offset estimate and the second offset estimate comprises:
selecting the first offset estimate as the refined offset estimate if the first offset estimate is outside of a predefined range; and
selecting the second offset estimate as the refined offset estimate if the first offset estimate is within the predefined range.

19. The method of claim 16, wherein the refined offset estimate is a timing offset estimate or a phase offset estimate.

20. The method of claim 16, wherein the first offset estimate is a first autocorrelation bin associated with a first autocorrelation lag value and the second offset estimate is a second autocorrelation bin associated with a second autocorrelation lag value,
and wherein the determining a refined offset estimate based on the first offset estimate and the second offset estimate comprises:
selecting the first autocorrelation lag value or the second autocorrelation lag value as a combination autocorrelation lag value;
combining the first offset estimate and the second offset estimate using the combination autocorrelation lag value to generate a combination autocorrelation bin associated with the combination autocorrelation lag value; and
converting the combination autocorrelation lag value into the time domain or the phase domain to determine a refined offset estimate.

21. A mobile terminal device comprising:
a receiver circuit configured to receive a downlink signal comprising plurality of reference signal configurations associated with a plurality of transmission locations; and
a processing circuit configured to:
identify a first Demodulation Reference Signal (DMRS) configuration and a first Channel State Information Reference Signal (CSI-RS) configuration from the plurality of reference signals based on control information indicating that the first DMRS configuration and the CSI-RS configuration are associated with a transmission point of the plurality of transmission points;
generate a first offset estimate for the transmission point based on the first DMRS configuration and a second offset estimate for the transmission point based on the first CSI-RS configuration;
determine a refined offset estimate for the transmission point based on the first offset estimate and the second offset estimate, wherein the first offset estimate has a greater offset estimation range than the second offset estimate; and
performing offset compensation, using the refined offset estimate, on data traffic received from the transmission point.

22. The mobile terminal device of claim 21, wherein the processing circuit is further configured to perform offset compensation on data traffic received from the transmission point using the refined offset estimate.

23. The mobile terminal device of claim 21, wherein the downlink signal comprises a Long Term Evolution (LTE) downlink signal, and wherein the plurality of transmission locations comprise a plurality of transmission points in a Coordinated Multipoint (CoMP) network.

24. The mobile terminal device of claim 21, wherein the radio frequency processing circuit is further configured to:
receive the control information, wherein the control information indicates that the first DMRS configuration and the first CSI-RS configuration are quasi co-located.

* * * * *